(12) United States Patent
Wang et al.

(10) Patent No.: US 11,634,281 B2
(45) Date of Patent: Apr. 25, 2023

(54) TEMPORARY STORAGE SHELF BOARD, GOODS SHELF, CONTROL METHOD AND DEVICE, APPARATUS AND SYSTEM

(71) Applicant: SHANGHAI QUICKTRON INTELLIGENT TECHNOLOGY CO., LTD, Shanghai (CN)

(72) Inventors: Xinhao Wang, Shanghai (CN); Dan Tang, Shanghai (CN); Yangwei Zou, Shanghai (CN); Yundi He, Shanghai (CN); Wei Yang, Shanghai (CN)

(73) Assignee: SHANGHAI QUICKTRON INTELLIGENT TECHNOLOGY CO., LTD

( * ) Notice: Subject to any disclaimer, the term of this patent is extended or adjusted under 35 U.S.C. 154(b) by 0 days.

(21) Appl. No.: 17/933,723

(22) Filed: Sep. 20, 2022

(65) Prior Publication Data

US 2023/0008025 A1    Jan. 12, 2023

Related U.S. Application Data

(63) Continuation of application No. PCT/CN2021/070889, filed on Jan. 8, 2021.

(30) Foreign Application Priority Data

Mar. 27, 2020    (CN) .......................... 202010231545.9
Mar. 27, 2020    (CN) .......................... 202010231552.9
(Continued)

(51) Int. Cl.
G06F 7/00        (2006.01)
B65G 1/137       (2006.01)
B65G 1/04        (2006.01)

(52) U.S. Cl.
CPC ......... *B65G 1/1375* (2013.01); *B65G 1/0471* (2013.01)

(58) Field of Classification Search
CPC ...... B65G 1/1375; B65G 1/0471; B65G 1/04; B65G 1/0492; B65G 1/137; B65G 1/1378;
(Continued)

(56) References Cited

U.S. PATENT DOCUMENTS

| | | |
|---|---|---|
| 2020/0031578 A1 | 1/2020 | Lisso et al. |
| 2020/0087070 A1 | 3/2020 | Kakinuki |

FOREIGN PATENT DOCUMENTS

| | | |
|---|---|---|
| CN | 205405721 U | 7/2016 |
| CN | 205891856 U | 1/2017 |

(Continued)

*Primary Examiner* — Yolanda R Cumbess
(74) *Attorney, Agent, or Firm* — Husch Blackwell LLP

(57) ABSTRACT

A temporary storage shelf board, a goods shelf, a control method, an apparatus and a system are provided. The temporary storage shelf board is used for providing multiple temporary storage positions. The temporary storage shelf board is provided with fork pockets, and the fork pockets is used for cooperating with a fork arm of a first robot. A goods storage and retrieval channel of the first robot is formed below the temporary storage shelf board, and when goods are stored and retrieved, the first robot is located at the goods storage and retrieval channel, and the fork pockets cooperate with the fork arm on the first robot to store and retrieve the goods. Thus, the efficiency of goods storage and retrieval can be improved.

20 Claims, 12 Drawing Sheets

(30) Foreign Application Priority Data

Mar. 27, 2020 (CN) .......................... 202010232310.1
Sep. 2, 2020 (CN) .......................... 202021892576.0
Oct. 15, 2020 (CN) .......................... 202022292766.5

(58) Field of Classification Search
CPC . G05B 19/41895; B25J 13/089; B25J 9/1664;
B25J 9/1682; B25J 9/1661; B25J 9/1684;
B25J 11/008
USPC .......................... 700/213–214, 218, 223, 228
See application file for complete search history.

(56) References Cited

FOREIGN PATENT DOCUMENTS

| | | | |
|---|---|---|---|
| CN | 108482925 | A | 9/2018 |
| CN | 109048952 | A | 12/2018 |
| CN | 109987366 | A * | 7/2019 |
| CN | 109987366 | A | 7/2019 |
| CN | 110603209 | A | 12/2019 |
| CN | 110654760 | A | 1/2020 |
| CN | 210162597 | U | 3/2020 |
| CN | 111232530 | A | 6/2020 |
| CN | 111361908 | A | 7/2020 |
| CN | 111453275 | A | 7/2020 |
| EP | 3728079 | A1 | 10/2020 |
| JP | 6777232 | B2 | 10/2020 |
| KR | 1020200003847 | A | 1/2020 |
| WO | 2019008999 | A1 | 1/2019 |
| WO | 2019123254 | A1 | 6/2019 |

* cited by examiner

TEMPORARY STORAGE SHELF BOARD, GOODS SHELF, CONTROL METHOD AND DEVICE, APPARATUS AND SYSTEM

The present disclosure claims priority to Chinese Patent Application No. 202010231552.9, filed with the Chinese Patent Office on Mar. 27, 2020 and entitled "SHELF AND WAREHOUSING APPARATUS," which is incorporated herein by reference in its entirety. The present disclosure claims priority to Chinese Patent Application No. 202021892576.0, filed with the Chinese Patent Office on Sep. 2, 2020 with the utility model name "SHELF AND WAREHOUSING APPARATUS," which is incorporated herein by reference in its entirety. The present disclosure claims priority to Chinese Patent Application No. 202010231545.9, filed with the Chinese Patent Office on Mar. 27, 2020 and entitled "WAREHOUSING APPARATUS, SYSTEM, AND CONTROL METHOD," which is incorporated herein by reference in its entirety. The present disclosure claims priority to Chinese Patent Application No. 202010232310.1, filed with the Chinese Patent Office on Mar. 27, 2020 and entitled "IN-WAREHOUSE AND EX-WAREHOUSE CONTROL METHODS AND APPARATUSES, DEVICE, AND READABLE STORAGE MEDIUM," which is incorporated herein by reference in its entirety. In addition, the present disclosure claims priority to Chinese Patent Application No. 202022292766.5, filed with the Chinese Patent Office on Oct. 15, 2020 with the utility model name "DOCKING PLATFORM AND WORKSTATION," which is incorporated herein by reference in its entirety.

TECHNICAL FIELD

The present disclosure relates to the field of warehousing technologies, and in particular, to a temporary storage layer board, a shelf, a control method and apparatus, a device, and a system.

BACKGROUND

A shelf is a facility for three-dimensional storage of cargoes, and can increase the utilization efficiency of a warehouse.

The existing warehousing industry mostly uses a robot integrated with automatic climbing and moving capabilities to access and transfer cargoes. However, the robot needs to stop and extend a robotic arm to a layer board of a shelf when accessing the cargoes, which will take a certain amount of time and reduce the efficiency of accessing the cargoes.

SUMMARY

The embodiments of the present disclosure provide a temporary storage layer board, a shelf, a control method and apparatus, a device, and a system to solve or alleviate one or more technical problems in the related art.

In order to achieve the above purpose, the present disclosure adopts the following technical solutions:

As a first aspect of the embodiments of the present disclosure, an embodiment of the present disclosure provides a temporary storage layer board, used to provide a plurality of temporary storage positions, wherein the temporary storage layer board is provided with a furcal groove, and the furcal groove is used to cooperate with a furcal arm of a first robot; a cargo access channel for the first robot is formed below the temporary storage layer board, when accessing a cargo, the first robot is in the cargo access channel, and the furcal groove cooperates with the furcal arm on the first robot to access the cargo.

As a second aspect of the embodiments of the present disclosure, an embodiment of the present disclosure provides a shelf, including:
a plurality of columns arranged at an interval in a horizontal direction;
at least one temporary storage layer board of any one of the foregoing implementations; and
at least one storage layer board, arranged at an interval with the temporary storage layer board in a vertical direction through the columns, wherein the storage layer board is used to provide a plurality of storage positions.

As a third aspect of the embodiments of the present disclosure, an embodiment of the present disclosure provides an in-warehouse control method, including:
determining a target temporary storage position according to a target storage position of a target cargo;
instructing a first robot to transfer the target cargo to the target temporary storage position; and
when a transfer completion signal sent by the first robot is received, instructing a second robot to transfer the target cargo from the target temporary storage position to the target storage position.

As a fourth aspect of the embodiments of the present disclosure, an embodiment of the present disclosure provides an ex-warehouse control method, including:
instructing a second robot to transfer a target cargo away from a current storage position;
determining a target temporary storage position according to a position of the second robot;
instructing the second robot to transfer the target cargo to the target temporary storage position; and
when a transfer completion signal sent by the second robot is received, instructing a first robot to transfer the target cargo away from the target temporary storage position.

As a fifth aspect of the embodiments of the present disclosure, an embodiment of the present disclosure provides an in-warehouse control apparatus, including:
a first determination module, configured for determining a target temporary storage position according to a target storage position of a target cargo;
a first instruction module, configured for instructing a first robot to transfer the target cargo to the target temporary storage position; and
a second instruction module, configured for when a transfer completion signal sent by the first robot is received, instructing a second robot to transfer the target cargo from the target temporary storage position to the target storage position.

As a sixth aspect of the embodiments of the present disclosure, an embodiment of the present disclosure provides an ex-warehouse control apparatus, including:
a first instruction module, configured for instructing a second robot to transfer a target cargo away from a current storage position;
a first determination module, configured for determining a target temporary storage position according to a position of the second robot;
a second instruction module, configured for instructing the second robot to transfer the target cargo to the target temporary storage position; and
a third instruction module, configured for when a transfer completion signal sent by the second robot is received, instructing a first robot to transfer the target cargo away from the target temporary storage position.

As a seventh aspect of the embodiments of the present disclosure, an embodiment of the present disclosure provides a control device, including: a processor and a memory, wherein the memory stores instructions, and the instructions, when loaded and executed by the processor, implement the method of any one of the foregoing implementations.

As an eighth aspect of the embodiments of the present disclosure, an embodiment of the present disclosure provides a warehousing system, including:

the temporary storage layer board of any one of the foregoing implementations; and the control device of any one of the foregoing implementations.

As a ninth aspect of the embodiments of the present disclosure, an embodiment of the present disclosure provides a computer-readable storage medium. The computer-readable storage medium store a computer program, wherein the computer program, when executed by a computer, implements the method of any one of the foregoing implementations.

One of the foregoing technical solutions has the following advantages or beneficial effects that: the temporary storage layer board provides a furcal groove for cooperating with the furcal arm of the first robot, so that the furcal arm of the first robot may be directly inserted into the furcal groove of the temporary storage layer board, and the first robot may directly access cargoes on the temporary storage layer board, which avoids the operation of extending the robot arm to a shelf, and improves the efficiency of accessing the cargoes; in addition, the temporary storage layer board may temporarily store the cargoes, and the storage positions provided by the storage layer board may store the cargoes for a long time, which is convenient to cooperate the temporary storage layer board with the storage layer board to improve the ex-warehouse and in-warehouse efficiency of the cargoes.

BRIEF DESCRIPTION OF THE DRAWINGS

To describe the technical solutions in the embodiments of the present disclosure or the related art more clearly, the following briefly describes the accompanying drawings required for describing the embodiments or the related art. Apparently, the accompanying drawings in the following description are merely some embodiments described in the embodiments of the present disclosure, and a person of ordinary skill in the art may still derive other drawings from these accompanying drawings.

DETAILED DESCRIPTION

Only some exemplary embodiments are briefly described below. As a person skilled in the art may realize, the described embodiments may be modified in various different ways without departing from the spirit or scope of the present disclosure. Therefore, the drawings and description are regarded as illustrative and not restrictive in nature.

Embodiment 1

Figure 1:
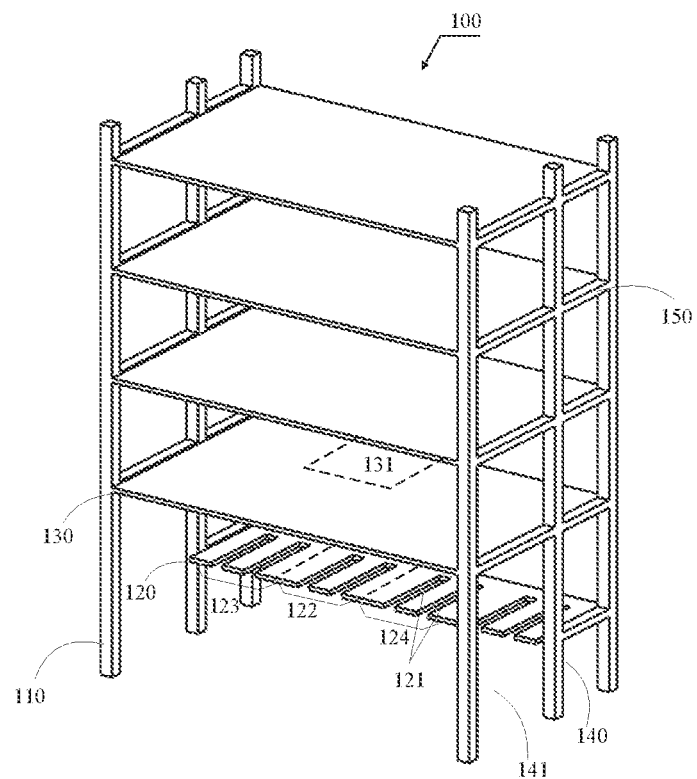
FIG. 1 shows a first schematic structural diagram of a shelf according to Embodiment 1 of the present disclosure.
Figure 3:
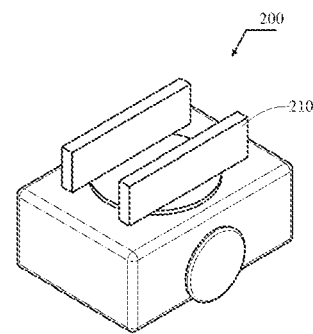
FIG. 3 shows a schematic structural diagram of a first robot according to Embodiment 1 of the present disclosure.
Figure 4:
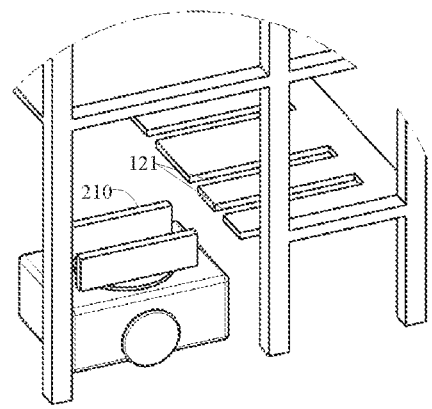
FIG. 4 shows a schematic diagram of cooperation between a furcal groove of a temporary storage layer board and a furcal arm of a first robot according to Embodiment 1 of the present disclosure.

FIG. 1 shows a first schematic structural diagram of a shelf according to Embodiment 1 of the present disclosure. As shown in FIG. 1, FIG. 3, and FIG. 4, the shelf 100 may include: a plurality of columns 110 arranged at an interval in a horizontal direction; at least one temporary storage layer board 120, wherein the temporary storage layer board 120 is provided with a furcal groove 121, and the furcal groove 121 is used to cooperate with a furcal arm 210 of the first robot 200; at least one storage layer board 130, the storage layer board 130 is arranged at an interval with the temporary storage layer board 120 in a vertical direction through the columns 110, and the storage layer board 130 is used to provide a plurality of storage positions.

The shelf 100 may be a single-row shelf, a double-row shelf, or a multi-row shelf, and the row number of the shelf 100 is not limited in the present disclosure.

In an example, the plurality of columns 110 may enclose a rectangular area in which the temporary storage layer board 120 and the storage layer board 130 are mounted, so that the temporary storage layer board 120 and the storage layer board 130 are arranged at an interval in the vertical direction through the columns 110. However, arrangement positions of the columns 110 are not limited in this embodiment, as long as the temporary storage layer board 120 and the storage layer board 130 may be arranged at an interval in the vertical direction. For example, the columns 110 may also pass through the middle of the temporary storage layer board 120 and the storage layer board 130 in the vertical direction, instead of an edge of the temporary storage layer board 120 and the storage layer board 130.

For ease of description, in the following embodiments, two long sides of the temporary storage layer board 120 are set as a first side and a second side of the temporary storage layer board 120 respectively, outer sides of the two long sides of the temporary storage layer board 120 are set as a first outer side and a second outer side of the temporary storage layer board 120 respectively, two short sides of the temporary storage layer board 120 are set as a third side and a fourth side of the temporary storage layer board 120 respectively (the two short sides of the temporary storage layer board 120 may also be referred to as a first end and a second end of the temporary storage layer board 120 respectively), and outer sides of the two short sides of the temporary storage layer board 120 are set as a third outer side and a fourth outer side of the temporary storage layer board 120 respectively. Herein, the first outer side of the temporary storage layer board 120 may also be referred to as the first outer side of the temporary storage layer board 120.

A plurality of temporary storage positions may be provided on the temporary storage layer board 120, and the plurality of temporary storage positions include two or more temporary storage positions; a furcal groove 121 is arranged under each temporary storage position, and the shape of the furcal groove 121 may be U-shaped, C-shaped, I-shaped, V-shaped, or the like. The shape of the furcal groove 121 is not limited in the present disclosure, as long as the furcal groove 121 can cooperate with the furcal arm 210 of the first robot 200.

The temporary storage layer board 120 may be located on any layer of the shelf 100, which is not limited in the embodiment of the present disclosure. Herein, when the temporary storage layer board 120 is located in a middle layer of the shelf 100, the storage layer board 130 is located above and below the temporary storage layer board 120, which may shorten distances between the temporary storage layer board 120 and the storage layer board 130, and improve the transfer efficiency of the cargoes between the temporary storage layer board 120 and the storage layer board 130. The cargoes may be boxes containing articles, such as materials, products, and the like. The boxes may be cardboard boxes or material boxes, and the type of the boxes and the articles contained therein are not limited in the present disclosure.

The first robot 200 may be an AGV (Automated Guided Vehicle, AGV for short) vehicle with the furcal arm 210, and the furcal arm 210 of the first robot 200 may be arranged on the top of the first robot 200, and may also be arranged on the side of the first robot 200. The arrangement manner of the furcal arm 210 of the first robot 200 is not limited in the embodiment of the present disclosure.

In this embodiment, the temporary storage layer board 120 provides the furcal groove 121 used for cooperating with the furcal arm 210 of the first robot 200, so that the furcal arm 210 of the first robot 200 may be directly inserted into the furcal groove 121 of the temporary storage layer board 120, and then the first robot 200 may directly access the cargoes on the temporary storage layer board 120, which avoids the operation of extending the robot arm to the shelf 100, and improves the efficiency of accessing cargoes; in addition, the temporary storage layer board 120 may temporarily store the cargoes, and the storage positions provided by the storage layer board 130 may store the cargoes for a long time, which is convenient to cooperate the temporary storage layer board 120 with the storage layer board 130 to improve the ex-warehouse and in-warehouse efficiency of the cargoes.

Illustratively, the cargo access channel 140 for placing the first robot 200 is formed below the temporary storage layer board 120. When accessing cargoes, and when the first robot 200 is in the cargo access channel 140, the furcal groove 121 cooperates with the furcal arm 210 on the first robot 200 to access the cargoes.

In an example, when storing cargoes, the first robot 200 aligns the furcal arm 210 with the furcal groove 121 at the first outer side of the temporary storage layer board 120 and drives to the cargo access channel 140, so that the furcal arm 210 is directly inserted into the furcal groove 121, and the cargoes are located on the temporary storage layer board 120, and then the furcal arm 210 is lowered so that the cargo box is left on the temporary storage layer board 120; and when picking up cargoes, the first robot 200 drives to the lower side of the cargo access channel 140, aligns the furcal arm 210 with the furcal groove 121 below the temporary storage layer board 120 and lifts the furcal arm 210 to jack up the cargo box, and then drives in a direction away from the first outer side of the temporary storage layer board 120 to leave the cargo access channel 140, to take away the cargo box. In this way, the first robot 200 may directly insert and pick up the cargoes without stopping driving or stopping driving for a short time, eliminating the operation of controlling the robot arm to extend to the layer board, which may improve the efficiency of accessing the cargo box, and accessing and picking up are performed below the temporary storage layer board 120, which may effectively utilize the space of the shelf 100.

Illustratively, the cargo access channel may be used for the first robot to drive when the first robot is unloaded. For example, when the first robot 200 is unloaded (namely, the first robot 200 is not loaded with the cargo), the first robot 200 may directly drive in the cargo access channel 140, which may improve the transfer efficiency of cargoes.

In an implementation, the columns 110 are arranged on the outer periphery of the storage layer board 130, and a first driving channel 141 for the first robot 200 to drive is formed between the temporary storage layer board 120 and the columns 110 located on the first outer side of the temporary storage layer board 120.

In an example, when the temporary storage layer board 120 is located at the bottom layer of the columns 110, the temporary storage layer board 120, the columns 110 located on the first outer side of the temporary storage layer board 120, and the ground may form the first driving channel 141 for the first robot 200 to drive. In addition, when the temporary storage layer board 120 is located at a further layer other than the bottom layer of the columns 110, the temporary storage layer board 120, the columns 110 located on the first outer side of the temporary storage layer board 120, and a storage layer board 130 located on a layer below and next to the layer where the temporary storage layer board 120 is located may form the first driving channel 141 for the first robot 200 to drive.

In this implementation, the first driving channel 141 for the first robot 200 to drive is formed between the temporary storage layer board 120 and the columns 110 located on the first outer side of the temporary storage layer board 120, so that the first robot 200 may drive in any layer of the shelf 100, which is convenient for the first robot 200 to cooperate with the temporary storage layer board 120, and avoids occupying a channel outside the shelf 100.

In an example, as shown in FIG. 1, the shelf 100 may further include: cross beams 150, wherein each of the cross beams 150 is arranged in a horizontal direction and is used for fixing short sides of the temporary storage layer board 120 and the storage layer board 130 on the columns 110.

Figure 2:
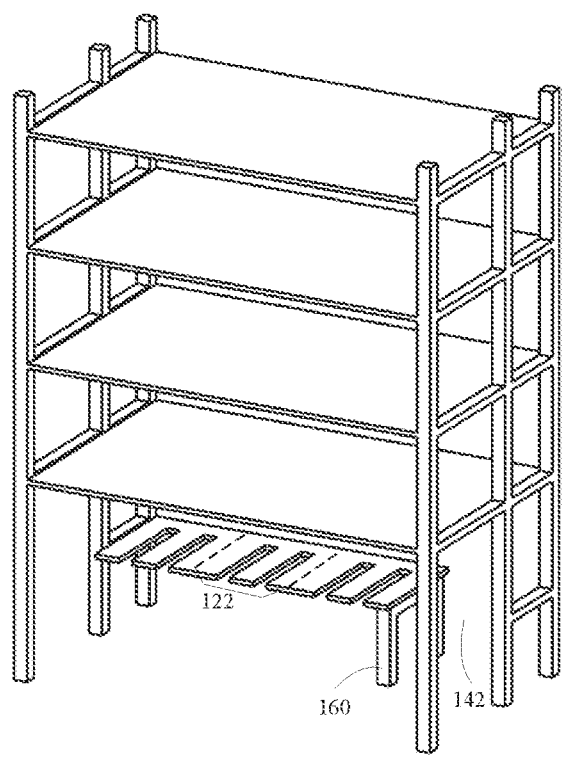
FIG. 2 shows a second schematic structural diagram of the shelf according to Embodiment 1 of the present disclosure.

FIG. 2 shows a second schematic structural diagram of a shelf according to Embodiment 1 of the present disclosure. The structure of the shelf is similar to the structure of the shelf in FIG. 1, the difference is that, as shown in FIG. 2, a second driving channel 142 for the first robot 200 to drive is formed between the temporary storage layer board 120 and the columns 110 located at the third outer side of the temporary storage layer board 120. In this way, the first robot 200 may pass through the shelf 100 in the second driving channel 142, so that a driving distance of the first robot 200 may be shortened, and transfer efficiency of cargo boxes may be improved.

In an example, the shelf 100 may further include: a support column 160 arranged at the third outer side of the temporary storage layer board 120 for support.

In an implementation, as shown in FIG. 1 to FIG. 4, the temporary storage layer board 120 includes a plurality of temporary storage boards 122, each of the temporary storage boards 122 is provided with a furcal groove 121, and a third driving channel for the first robot 200 to drive (can refer to a third driving channel 143 in FIG. 9) is formed between at least two of the temporary storage boards 122. In this way, the first robot 200 may pass through the shelf 100 between any two temporary storage boards 122 of the temporary storage layer board 120, so that a driving distance of the first robot 200 may be shortened, and transfer efficiency of cargo boxes may be improved.

In an example, each temporary storage board 122 corresponds to one temporary storage position, so that a cargo may be placed on each temporary storage board 122.

In an implementation, the width of the temporary storage layer board 120 is less than a half of the width of the storage layer board 130. For example, as shown in FIG. 1 to FIG. 4, the shelf 100 may be a double-row shelf, the temporary storage layer board 120 may be located in one row in the double-row shelf, the storage layer board 130 extends from the one row in the double-row shelf to the other row of the double-row shelf in the horizontal direction, and the width of the temporary storage layer board 120 is set to be less than a half of the width of the storage layer board 130.

In this implementation, since the width of the channel for the cargoes is greater than the width of the first robot 200, the width of the temporary storage layer board 120 is set to be less than a half of the width of the storage layer board 130, the width of the first driving channel 141 may be greater than the width of the storage layer board 130, to provide a channel wide enough for the first robot 200 to transfer cargoes; and because the width of the storage layer board 130 is greater than twice width of the temporary storage layer board 120, the storage layer board 130 may store a cargo whose size is slightly larger than that of the temporary storage position.

Figure 5:
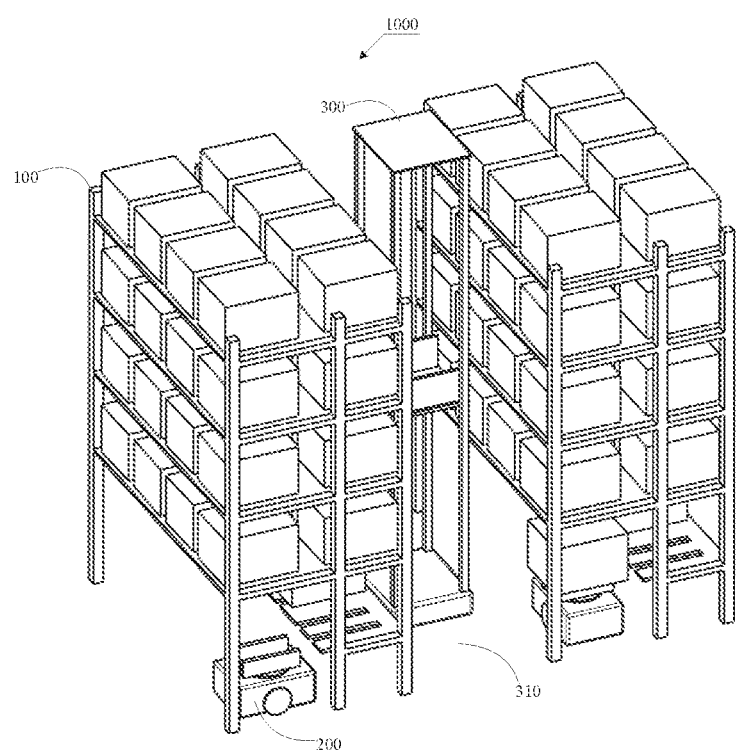
FIG. 5 shows a first schematic structural diagram of a warehousing apparatus according to Embodiment 1 of the present disclosure.
Figure 6:
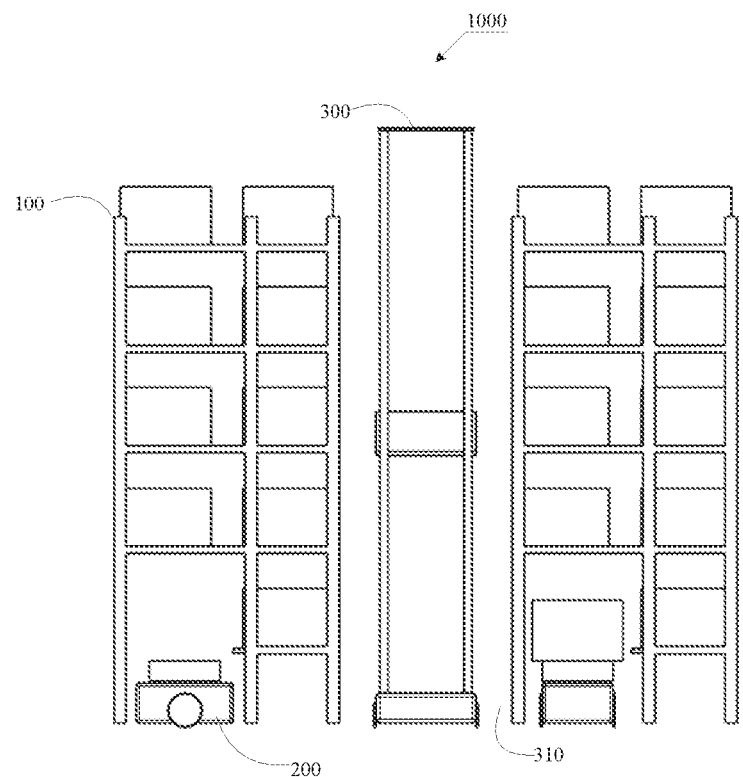
FIG. 6 shows a schematic side view of FIG. 5.
Figure 7:
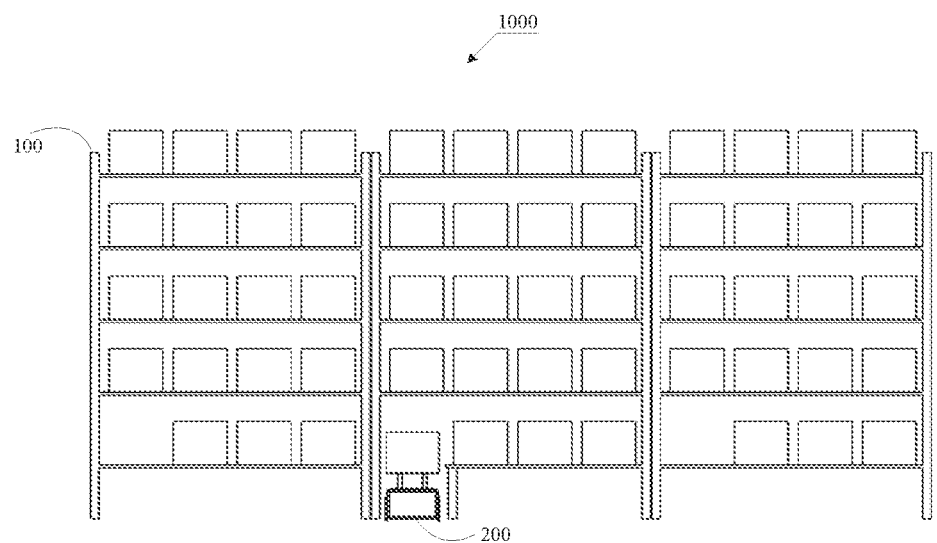
FIG. 7 shows a second schematic structural diagram of the warehousing apparatus according to Embodiment 1 of the present disclosure.
Figure 8:
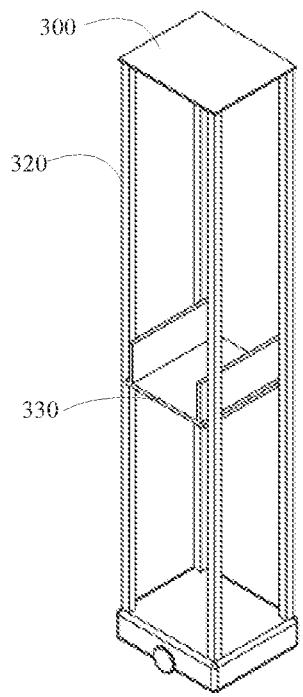
FIG. 8 shows a schematic structural diagram of a second robot according to Embodiment 1 of the present disclosure.

FIG. 5 shows a first schematic structural diagram of a warehousing apparatus according to Embodiment 1 of the present disclosure. FIG. 6 shows a schematic side view of FIG. 5. As shown in FIG. 5 and FIG. 6, the warehousing apparatus 1000 includes: a plurality of shelves 100 of any one of the foregoing implementations; wherein, the temporary storage layer boards 120 of the shelves 100 are used to provide a plurality of temporary storage positions; a second robot channel 310 for a second robot 300 to drive is formed between adjacent shelves 100, and the second robot 300 is used to transfer a cargo between the temporary storage layer board 120 and the storage layer boards 130.

Herein, the number of the shelves 100 in the warehousing apparatus 1000 includes two or more, which is not limited in the embodiment of the present disclosure.

The second robot 300 may be the AGV vehicle with a lifting mechanism 320 and an access mechanism 330, or may also be a stacking machine, or the like. The type of the second robot 300 is not limited in the embodiment of the present disclosure, as long as the second robot 300 has the functions of accessing and transferring cargoes.

As shown in FIG. 5 to FIG. 9, the plurality of shelves 100 may be arranged in columns, in rows, or in a matrix. The arrangement manner of the plurality of shelves 100 is not limited in the embodiment of the present disclosure.

In this embodiment, the second robot channel 310 is formed between adjacent shelves 100, so that the second robot 300 may drive in the second robot channel 310, so as to transfer cargoes between the temporary storage layer board 120 and the storage layer board 130. The cargoes temporarily stored in the temporary storage layer board 120 are transferred to the storage layer board 130 for in-warehouse storage, or the cargoes stored in the storage layer board 130 are transferred to the temporary storage layer board 120 for the ex-warehouse temporary storage, which may improve the access efficiency and the ex-warehouse and in-warehouse efficiency of the cargoes. In addition, the second robot channel 310 does not coincide with the driving channel of the first robot 200, which may avoid the first robot 200 and the second robot 300 sharing a driving channel, improve the cooperation efficiency of the first robot 200 and the second robot 300, and then improve the ex-warehouse and in-warehouse efficiency.

In an implementation, the warehousing apparatus 1000 may include: a first robot channel for the first robot 200 to drive, wherein the first robot 200 is used to cooperate with the furcal groove 121 through the furcal arm 210 of the first robot 200, to access the cargoe on the temporary storage layer board 120. Herein, the first robot channel may be defined by the structure of the shelf 100, or may be located on a side outside the shelf 100. The second robot channel may be located on the other side outside the shelf 100, so as to separate the first robot channel from the second robot channel to avoid channel occupation.

In this implementation, forming the first robot channel and the second robot channel respectively can further avoid the first robot 200 and the second robot 300 sharing a driving channel, which may improve the driving efficiency of the first robot 200 and the second robot 300, and then improve the ex-warehouse and in-warehouse efficiency.

It should be noted that, in the warehousing apparatus 1000, the second robot 300 integrated with a lifting mechanism 320 and an access mechanism 330 is generally used to transfer and access cargoes. However, because the cost of the second robot 300 is relatively high, and there are relatively long distances between a docking platform 400 for the cargoes and each temporary storage position and each storage position in the shelf 100, the ex-warehouse and in-warehouse costs of the cargoes per unit time are relatively high, and the efficiency is relatively low.

By forming the second robot channel 310 between adjacent shelves 100, the warehousing apparatus 1000 of the embodiment of the present disclosure may be configured with the second robot 300 to transfer cargoes between the temporary storage layer board and the storage layer board, and may be configured with the first robot 200 to transfer and access the cargoes on the temporary storage layer board, wherein the first robot 200 may not have a lifting mechanism, and the cost of the first robot 200 is much lower than that of the second robot 300. In this way, one second robot 300 may be equipped with a plurality of first robots 200 for coordinating access of cargoes, which may reduce the ex-warehouse and in-warehouse costs of the cargoes per unit time and may improve the ex-warehouse and in-warehouse efficiency of the cargoes.

Figure 9:
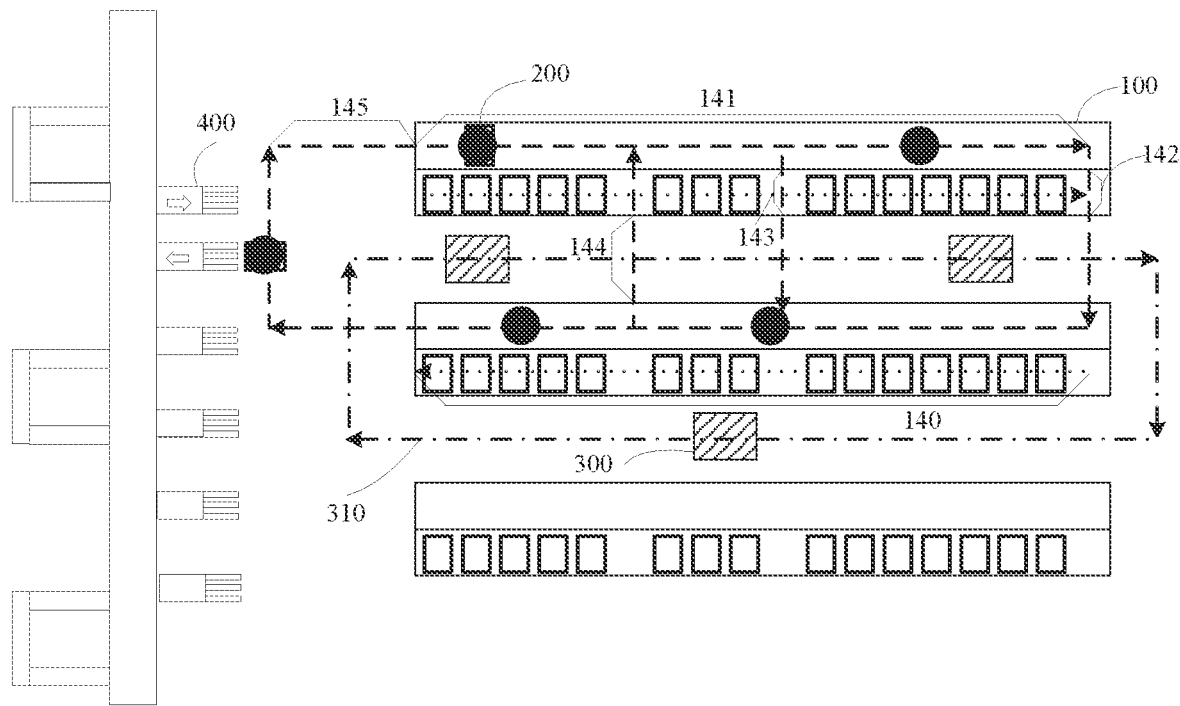
FIG. 9 shows a schematic diagram of the projection of cargo boxes, located on the temporary storage layer board, on the warehousing apparatus according to Embodiment 1 of the present disclosure.

In an implementation, as shown in FIG. 9, the temporary storage layer board includes a plurality of temporary storage boards, a third driving channel 143 for the first robot 200 to drive is formed between at least two of the temporary storage boards. The width of the third driving channel 143 may be one, two, three, or more times the width of the temporary storage board, which is not limited in the present disclosure. For example, the temporary storage boards may be removed from the temporary storage layer boards to form the third driving channel 143. In this way, the first robot 200 may pass through the shelf in the third driving channel 143 to improve the driving efficiency.

In an implementation, as shown in FIG. 9, a fourth driving channel 144 for the first robot 200 to drive is formed between two adjacent shelves 100, and connects two third driving channels 143 or two second driving channels 142. In this way, the first robot 200 may pass through the shelf 100 via the third driving channel 143 and then drives along the fourth driving channel 144 to an adjacent shelf 100, thereby shortening a driving distance of the first robot 200 and improving the transfer efficiency of the cargoes.

In an implementation, the warehousing apparatus 1000 further includes a docking platform 400 (the docking platform 400 may also be referred to as a docking port). A second driving channel 142 for the first robot 200 to drive is formed between the temporary storage layer board and the columns at the third outer side of the temporary storage layer board, and a fifth driving channel 145 for the first robot 200 to drive is formed between the docking platform 400 and the shelf 100. For example, a fifth driving channel 145 for the first robot 200 to drive is formed between the docking platform 400 and the columns located at the fourth outer side of the temporary storage layer board. In this way, the first robot 200 may directly drive from the docking platform 400 along the fifth driving channel 145 to the first driving channel 141, for the first robot 200, in the shelf 100, and can quickly reach the temporary storage layer board, thereby improving the cooperation efficiency.

In an example, the fifth driving channel 145, the first driving channel 141, and the second driving channel 142/the fourth driving channel 144 form a first driving loop for the first robot 200 to drive (a line segment loop with arrows in FIG. 9).

In an example, the cargo access channel 140 below the temporary storage layer board may form a second driving loop (a dashed line with arrows in FIG. 9) for the first robot to drive, so that the first robot 200 drives when being unloaded.

In an example, the first robot channel includes the cargo access channel 140, and the first driving channel 141, the second driving channel 142, the third driving channel 143, the fourth driving channel 144, and the fifth driving channel 145 for the first robot.

In an example, the second robot channel 310 of the second robot 300 may form a loop (a dotted line with arrows in FIG. 9) for the second robot 300 to drive.

By arranging the first driving loop, the second driving loop, and the loop for the second robot 300 to drive in the foregoing examples, the first robot 200 and the second robot 300 may be prevented from occupying each other's driving channel, thereby improving the cooperation efficiency between the two. In this way, a plurality of first robots 200 and a plurality of second robots 300 may be arranged to implement the ex-warehouse and in-warehouse of the cargoes and improve the ex-warehouse and in-warehouse efficiency.

Embodiment 2

Figure 10A:
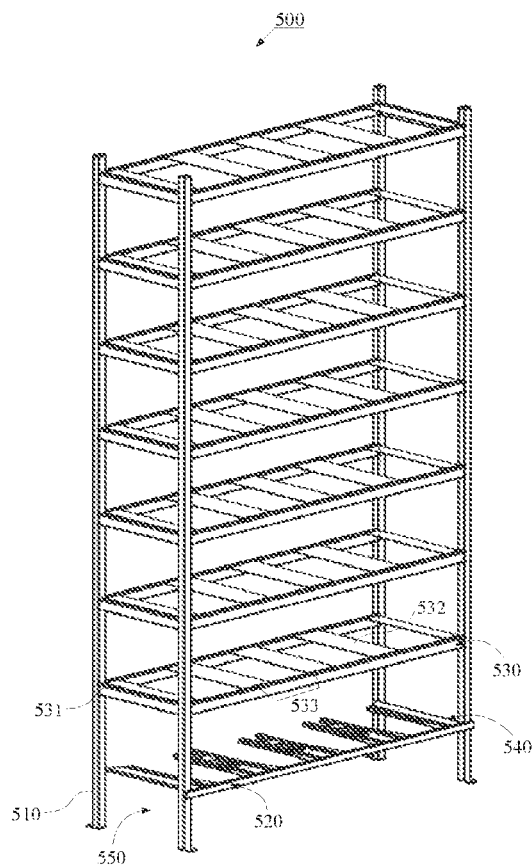
FIG. 10A shows a first schematic structural diagram of a shelf according to Embodiment 2 of the present disclosure.
Figure 10B:
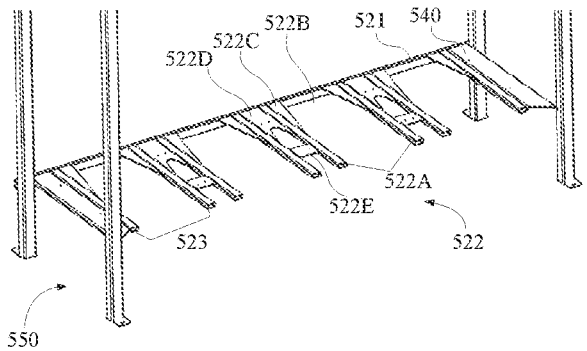
FIG. 10B shows a schematic structural diagram of a temporary storage layer board in FIG. 10A.

FIG. 10A shows a first schematic structural diagram of a shelf according to Embodiment 2 of the present disclosure. FIG. 10B shows a schematic structural diagram of a temporary storage layer board in FIG. 10A. As shown in FIG. 10A and FIG. 10B, the difference between the shelf 500 and the above shelf 100 is that, the temporary storage layer board 520 includes a cross beam 521 arranged in a horizontal direction and a plurality of temporary storage members 522 arranged at an interval on an inner side of the cross beam 521.

Illustratively, each of two ends of the cross beam 521 may be fixed to a column 510. For example, the temporary storage members 522 may be screwed and fixed to the inner side of the cross beam 521 by bolts and nuts, as well as the two ends of the cross beam 521 may be screwed and fixed to the columns 510 by bolts and nuts. The temporary storage member 522 includes two support arms 522A and a furcal groove 522B formed between the two support arms 522A. Herein, the temporary storage position 523 may be formed by the temporary storage member 522. For example, the two support arms 522A of the temporary storage member 522 and the area surrounded by the two support arms 522A of the temporary storage member 522 may form a temporary storage position 523, and the furcal groove 522B is located in the middle of the temporary storage position 523, which may be beneficial to cooperate with a single furcal arm. A plurality of temporary storage members 522 may provide a plurality of temporary storage positions 523. When the temporary storage member 522 temporarily stores a cargo, the two support arms 522A of the temporary storage member 522 jointly bear the cargo, so that the cargo is temporarily stored on the temporary storage position 523.

Preferably, the support arm 522A of the temporary storage member 522 may be made of square steel, so that the strength of the temporary storage member 522 is sufficient to bear cargoes and has less consumable, which may save manufacturing costs. The furcal groove 522B formed between two support arms 522A may be matched with the furcal arm carrying cargoes, and the furcal arm may be directly inserted into the furcal groove 522B for cargo access, which may reduce the inserting and picking up operations of the furcal arm and improve the access speed and access efficiency of the cargoes.

The storage layer board 530 is arranged at an interval with the temporary storage layer board 520 in a vertical direction through the columns 510, and the storage layer board 530 is used to provide a plurality of storage positions 533, so as to store a cargo for a long time. Herein, the temporary storage layer board 520 may be located at any layer of the shelf 500. For example, the temporary storage layer board 520 may be located at the bottom layer of the shelf 500, and the storage layer board 530 is located above the temporary storage layer board 520, which is beneficial to temporarily store a cargo on the bottom layer of the shelf 500. The temporary storage layer board 520 may be located at the top layer of the shelf 500, and the storage layer board 530 is located below the temporary storage layer board 520, which is beneficial to temporarily store a cargo on the top layer of the shelf 500. The temporary storage layer board 520 may be located at a middle layer of the shelf 500, and the storage layer boards 530 are located above and below the temporary storage layer board 520, which may improve the transfer efficiency of cargoes between the temporary storage layer board 520 and the storage layer boards 530.

In an example, as shown in FIG. 10A and FIG. 10B, the storage layer board 530 includes cross beams 531 arranged in a horizontal direction and a plurality of support plates 532 arranged at an interval on the cross beams 531, wherein the cross beams 531 are arranged around the outer periphery of the plurality of support plates 532, two short sides of each support plate 532 are respectively connected to the inner side of the cross beam 531, and each support plate 532 is arranged in parallel with the adjacent support arms 522A of the adjacent temporary storage members 522, and the edges at opposite sides of the adjacent support plates 532 and the area enclosed by them may form a storage position 533. In this way, the middle portion of the storage position 533 is hollow, which may reduce the weight of the storage layer board 530 and reduce the manufacturing cost.

In this embodiment, the temporary storage layer board 520 provides a temporary storage member 522 for temporarily storing cargoes, and a furcal groove 522B that may be cooperated with the furcal arm is formed between two support arms 522A of the temporary storage member 522, so that the furcal arm may directly insert into the furcal groove 522B of the temporary storage member 522, and then the cargoes may be directly accessed on the temporary storage layer board 520, avoiding the inserting and picking up operation of extending the furcal arm to the shelf 500 and improving the access efficiency of the cargoes. In addition, the temporary storage layer board 520 may temporarily store the cargoes, and the storage position provided by the storage layer board 530 may store the cargoes for a long time, which is convenient for the cooperation of the temporary storage layer board 520 and the storage layer board 530 to improve the ex-warehouse and in-warehouse efficiency of the cargoes.

In an implementation, the columns 510 may be arranged at the top corner positions of the temporary storage layer board 520 and the storage layer board 530, or may be arranged at the edges of the temporary storage layer board 520 and the storage layer board 530. The arrangement positions of the columns 510 are not limited in the present disclosure. The temporary storage layer board 520 and the storage layer board 530 may be screwed and fixed to the columns 510 by bolts and nuts.

In an implementation, as shown in FIG. 10B, the inner side of the cross beam 521 is fixedly connected to the first end of the support arm 522A; the temporary storage member 522 further includes a plurality of wing plates 522C, each wing plate 522C is connected to the inner side of the cross beam 521 and the inner side of each support arm 522A respective. In this way, the strength between the support arm 522A and the cross beam 521 may be strengthened.

Figure 10C:
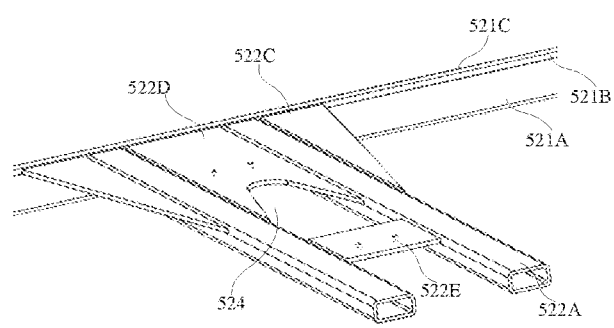
FIG. 10C shows a schematic structural diagram of a cross beam in FIG. 10A.

Specifically, as shown in FIGS. 10B and 10C, the cross beam 521 has an L-shaped cross section, the cross beam 521 includes a horizontal beam 521A and a vertical beam 521B, and the outer side of the vertical beam 521B is set as the outer side of the cross beam 521, the inner side of the vertical beam 521B is set as the inner side of the cross beam 521, the horizontal beam 521A is arranged on the inner side of the vertical beam 521B, and the first end of the support arm 522A may be fixedly connected to the horizontal beam 521A. The end surface of the first end of the support arm 522A may be fixedly connected to the inner side of the vertical beam 521B, and the wing plate 522C is respectively connected between the inner side of the vertical beam 521B and the inner side of the support arm 522A.

Further, a protrusion 521C is formed on the top of the inner side of the vertical beam 521B, so that the vertical beam 521B and the horizontal beam 521A may jointly form a clamping groove (not marked in the drawings) of the cross beam 521, so that the first end of the support arm 522A is clamped in the clamping groove of the cross beam 521, which may improve the firmness of the connection between the support arm 522A and the cross beam 521.

In an implementation, the wing plate 522C is in the form of a right-angled triangle, the first right angle side of the wing plate 522C is arranged along the inner side of the cross beam 521, and the second right angle side of the wing plate 522C is arranged along the inner side of the support arm 522A. For example, the first right angle side of the wing plate 522C may be arranged along the inner side of the vertical beam 521B, and the first right angle side of the wing plate 522C may also be clamped in the clamping groove of the cross beam 521.

In an example, the length of the first right angle side of the wing plate 522C may be less than the length of the second right angle side, so that the width of the wing plate 522C is narrower and the width of the wing plate 522C is gradually reduced along the first end of the support arm 522A towards the middle portion of the support arm 522A, such that the wing plate 522C may be avoided hindering the operation of the furcal arm.

Based on this, since the wing plate 522C is a right-angled triangle, the stability of the connection between the support arm 522A and the cross beam 521 may be improved.

In an implementation, the temporary storage layer board 520 may further include a plurality of fixing plates 522D, each fixing plate 522D is respectively connected between adjacent temporary storage members 522 and connected to the inner side of the cross beam 521. This may not only strengthen the strength between the temporary storage member 522 and the cross beam 521, but also improve the stability of the temporary storage member 522, thereby increasing the stability of the temporary storage layer board 520.

Specifically, the fixing plate 522D is rectangular, the long side of the fixing plate 522D is set as a side of the fixing plate 522D, the short side of the fixing plate 522D is set as an end of the fixing plate 522D, and two sides of the fixing plate 522D may be connected between the outer sides of adjacent support arms 522A of adjacent temporary storage members 522. One end of the fixing plate 522D is connected to the inner side of the vertical beam 521B, the other end of the fixing plate 522D is provided with a weight-reducing groove 524, and the groove width of the weight-reducing groove 524 gradually increases from the groove bottom to the rabbet. Herein, the groove bottom of the weight-reducing groove 524 is the side of the weight-reducing groove 524 close to the cross beam 521, and the rabbet of the weight-reducing groove 524 is the side of the weight-reducing groove 524 far away from the cross beam 521.

In an implementation, as shown in FIG. 10B and FIG. 10C, the temporary storage layer board 520 may further include a plurality of wedge plates 522E. Each wedge plate 522E is respectively connected between adjacent temporary storage members 522, and the wedge plate 522E is arranged close to the second end of the support arm 522A. For example, the wedge plate 522E is connected between the outer sides of adjacent support arms 522A of adjacent temporary storage members 522, so that the connection strength between the adjacent support arms 522A of the adjacent temporary storage members 522 may be increased, which is beneficial to improve the bearing capacity of the temporary storage member 522.

In an implementation, as shown in FIG. 10A to FIG. 10C, the shelf 500 may further include two support plates 540, each of the support plates 540 is connected to the end of the cross beam 521, and is between the support arm 522A located at the end of the cross beam 521 and the columns 510. In this way, the strength of the support arm 522A at the end of the cross beam 521 may be increased, and the stability of the support arm 522A can also be improved. For example, the support plate 540 may be in the shape of a right-angled trapezoid, the right-angled waist of the support plate 540 is connected to the inner side of the end of the cross beam 521, the short bottom side of the support plate 540 is connected to the outer side of the support arm 522A located at the end of the cross beam 521, and the long bottom side of the support plate 540 is connected to the columns 510; herein, the length of the support arm 522A may be smaller than the length of the long bottom side of the support plate 540.

In an implementation, as shown in FIG. 10A and FIG. 10B, a cargo access channel 550 for placing the first robot is formed below the temporary storage layer board 520; when accessing a cargo, and when the first robot is in the cargo access channel 550, the furcal groove 522B cooperates with the furcal arm of the first robot to access the cargo. Specifically, when storing a cargo (refer to FIG. 12C), the first robot aligns the furcal arm with the furcal groove 522B from the first outer side of the temporary storage layer board 520 and drives to the cargo access channel 550, so that the furcal arm directly inserted into the furcal groove 522B, and the cargo is located on the temporary storage layer board 520, and then the furcal arm is lowered so that the cargo box is left on the temporary storage layer board 520; and when picking up cargoes, the first robot drives to the lower side of the cargo access channel 550, aligns the furcal arm 520 with the furcal groove 522B below the temporary storage layer board 520 and lifts the furcal arm to jack up the cargo box, and then drives in a direction away from the first outer side of the temporary storage layer board 520 to leave the cargo access channel 550, to take away the cargo box. In this way, the first robot may directly insert and pick up the cargoes without stopping driving or stopping driving for a short time, eliminating the operation of controlling the robot arm to extend to the layer board, which may improve the efficiency of accessing the cargo box, and accessing and picking up are performed below the temporary storage layer board 520, which may effectively utilize the space of the shelf 500.

In an implementation, the cargo access channel 550 may be used for the first robot to drive when the first robot is unloaded. For example, when the first robot is unloaded (namely, the first robot is not loaded with a cargo), the first robot may directly drive in the cargo access channel 550, which may improve the transfer efficiency of cargoes.

Figure 11:
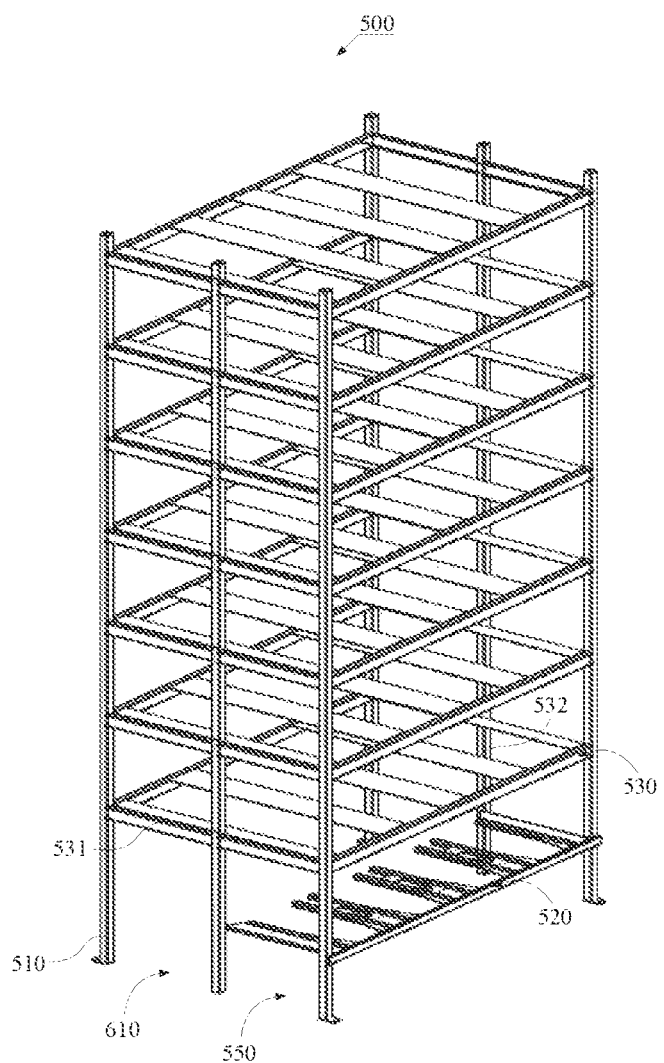
FIG. 11 shows a second schematic structural diagram of the shelf according to Embodiment 2 of the present disclosure.

FIG. 11 shows a second schematic structural diagram of the shelf according to Embodiment 2 of the present disclosure. As shown in FIG. 11, the difference between the shelf 500 and the above embodiment is that, the columns 110 are arranged on the outer periphery of the storage layer board 130, and a first driving channel 610 for the first robot to drive is formed between the temporary storage layer board 520 and the columns 510 located on the first outer side of the temporary storage layer board 520. Herein, the first robot may be an AGV (Automated Guided Vehicle, AGV for short) vehicle with a furcal arm, and the furcal arm of the first robot may be arranged on the top of the first robot, and may also be arranged on the side of the first robot. The arrangement manner of the furcal arm of the first robot is not limited in the embodiment of the present disclosure.

In an example, when the temporary storage layer board 520 is located at the bottom layer of the columns 510, the temporary storage layer board 520, the columns 510 located on the first outer side of the temporary storage layer board 520, and the ground may form the first driving channel 610 for the first robot to drive.

In an example, when the temporary storage layer board 520 is located at a further layer other than the bottom layer of the columns 510, the temporary storage layer board, the columns 510 located on the first outer side of the temporary storage layer board 520, and a storage layer board 530 located on a layer below and next to the layer where the temporary storage layer board 520 is located may form the first driving channel 610 for the first robot to drive.

In this implementation, the first driving channel 610 for the first robot to drive is formed between the temporary storage layer board 520 and the columns 510 located on the first outer side of the temporary storage layer board 520, so that the first robot may drive in any layer of the shelf 500, which is convenient for the first robot to cooperate with the temporary storage layer board 520, and avoids occupying a channel outside the shelf 500.

In an implementation, the width of the temporary storage layer board 520 is less than a half of the width of the storage layer board 530. For example, the shelf 500 may be a double-row shelf 500, the temporary storage layer board 520 may be located in one row in the double-row shelf 500, the storage layer board 530 extends from the one row in the double-row shelf 500 to the other row of the double-row shelf 500 in the horizontal direction, and the width of the temporary storage layer board 520 is set to be less than a half of the width of the storage layer board 530. The temporary storage layer board 520 may be used to temporarily store cargoes for a short time and the storage layer board 530 may be used to store cargoes for a long time. The width of the temporary storage layer board 520 is set to be less than a half of the width of the storage layer board 530, and therefore, one row of cargoes may be temporarily stored on the temporary storage layer board 520, and two rows of cargoes may be stored on the storage layer board 530, to suit the temporary storage and storage of cargoes. In addition, because the width of the storage layer board 530 is greater than twice width of the temporary storage layer board 520, the storage layer board 530 may store a cargo whose size is slightly larger than that of the temporary storage position 523. In addition, the width of the temporary storage layer board 520 is set to be less than a half of the width of the storage layer board 530, which is also beneficial to form a first drive channel 610 for the first robot to drive between the first outer side of the temporary storage layer board 520 and the columns 510, so that the width of the first drive channel 610 is greater than the width of the temporary storage layer board 520, so as to provide a channel wide enough for the first robot to transfer cargoes.

Figure 12A:
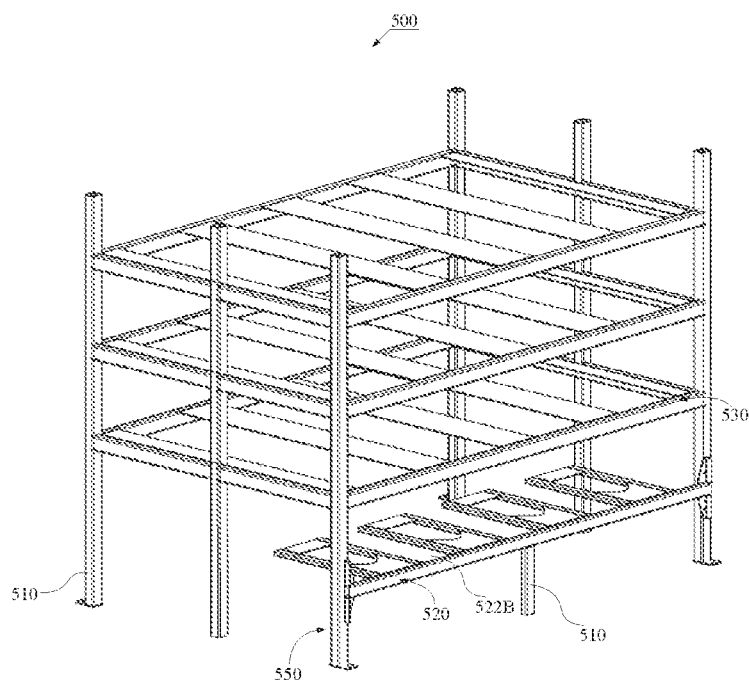
FIG. 12A shows a third schematic structural diagram of the shelf according to Embodiment 2 of the present disclosure.

FIG. 12A shows a third schematic structural diagram of the shelf according to Embodiment 2 of the present disclosure. As showed in FIG. 12A and FIG. 12B, the difference between the shelf 500 and the above embodiment is that, the temporary storage position 523 of the temporary storage layer board 520 is formed by adjacent support arms 522A of adjacent temporary storage members 522 and the area enclosed by them. The furcal grooves 522B of the temporary storage layer board 520 are located on both sides of the temporary storage position 523, which may be beneficial to cooperate with the first robot with two furcal arms. Specifically, as shown in FIG. 12A to FIG. 12C, when temporarily storing cargoes, the first robot 700 aligns the two furcal arms 701 with the furcal grooves 522B on both sides of the temporary storage position 523 from the first outer side of the temporary storage layer board 520, so that the two furcal arms 701 are directly inserted into the two furcal grooves 522B for cargo access.

In an implementation, a support column 710 is further provided in the middle of the cross beam 521 of the temporary storage layer board 520 to support the cross beam 521.

Figure 12B:
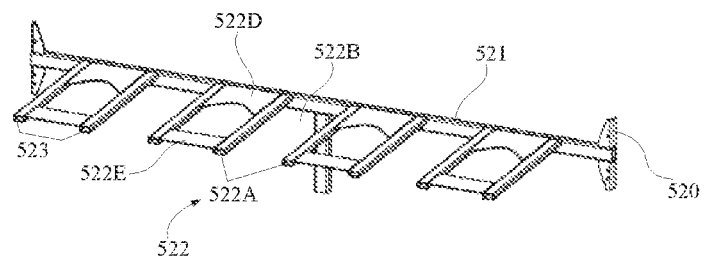
FIG. 12B shows a schematic structural diagram of a temporary storage layer board in FIG. 12A.
Figure 12C:
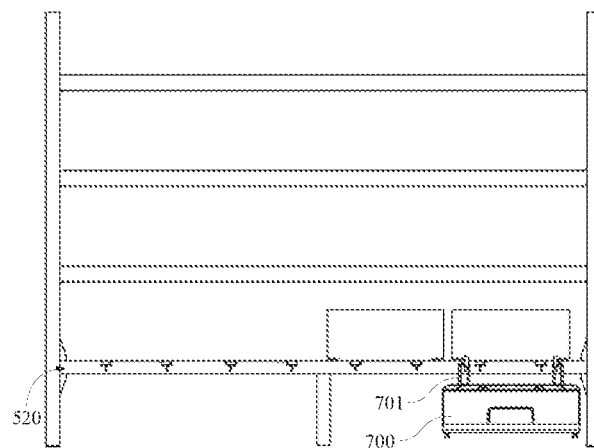
FIG. 12C shows a schematic diagram of cooperation between a first robot and a shelf in FIG. 12A.

In an implementation, as shown in FIG. 12B, mounting plates 720 may further be provided on the upper and lower sides of both ends of the cross beam 521 of the temporary storage layer board 520, so that the cross beam 521 may be mounted on the column 510 through the mounting plates 720 to increase the mounting strength between the cross beam 521 and the column 510. Herein, the mounting plate 720 may be in the form of a right-angled triangle, the first right angle side of the mounting plate 720 is connected to the side of the cross beam 521, and the edge of the second right angle side of the mounting plate 720 is screwed and fixed on the column 510 by bolts and nuts.

Figure 13A:
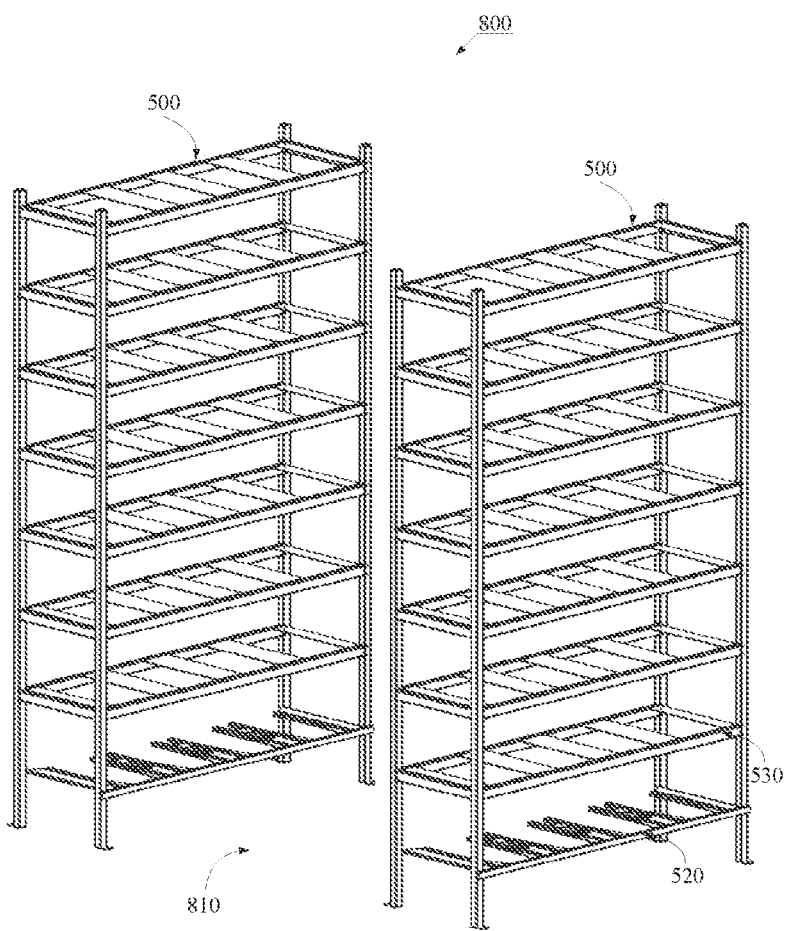
FIG. 13A shows a first schematic structural diagram of a warehousing apparatus according to Embodiment 2 of the present disclosure.
Figure 13B:
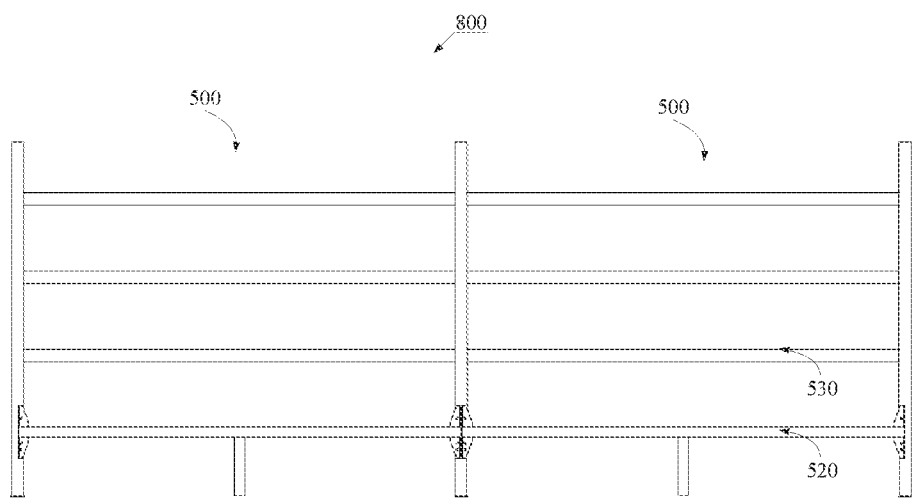
FIG. 13B shows a second schematic structural diagram of the warehousing apparatus according to Embodiment 2 of the present disclosure.

As shown in FIG. 13A and FIG. 13B, the present disclosure further provides a warehousing apparatus 800, which may include: a plurality of shelves 500 of any one of the foregoing implementations; and a second robot channel 810 for the second robot to drive, which is formed between adjacent shelves 500. The second robot is used to transfer cargoes between the temporary storage layer board 520 and the storage layer board 530.

Herein, the number of the shelves 500 in the warehousing apparatus 800 includes two or more, and the number of the shelves 500 in the warehousing apparatus 800 is not limited in the embodiment of the present disclosure.

The second robot may be the AGV vehicle with a lifting mechanism and an access mechanism, or may also be a stacking machine, or the like. The type of the second robot is not limited in the embodiment of the present disclosure, as long as the second robot has the functions of accessing and transferring cargoes.

The plurality of shelves 500 may be arranged in columns (as shown in FIG. 13A), arranged in rows (as shown in FIG. 13B, the second robot channel may be located on the cross beam side of the temporary storage layer board 520 on the shelves 500), or arranged in a matrix. The arrangement manner of the plurality of shelves 500 is not limited in the embodiment of the present disclosure.

In this embodiment, the second robot channel 810 is formed between adjacent shelves 500, so that the second robot may drive in the second robot channel 810, so as to transfer cargoes between the temporary storage layer board 520 and the storage layer board 530. The cargoes temporarily stored in the temporary storage layer board 520 are transferred to the storage layer board 530 for in-warehouse storage, or the cargoes stored in the storage layer board 530 are transferred to the temporary storage layer board 520 for the ex-warehouse temporary storage, which may improve the access efficiency and the ex-warehouse and in-warehouse efficiency of the cargoes; in addition, the second robot channel 810 does not coincide with the driving channel of the first robot, which may avoid the first robot and the second robot sharing a driving channel, improve the cooperation efficiency of the first robot and the second robot, and then improve the ex-warehouse and in-warehouse efficiency.

Embodiment 3

The embodiment of the present disclosure further provides an in-warehouse control method, which may be applied to the temporary storage layer board 120, the shelf 100, and the warehousing apparatus 1000 of any implementation in the foregoing Embodiment 1 or the warehousing apparatus 800 of any implementation in Embodiment 2. In Embodiment 3, the warehousing apparatus 1000 is used as an example for description.

Figure 14:
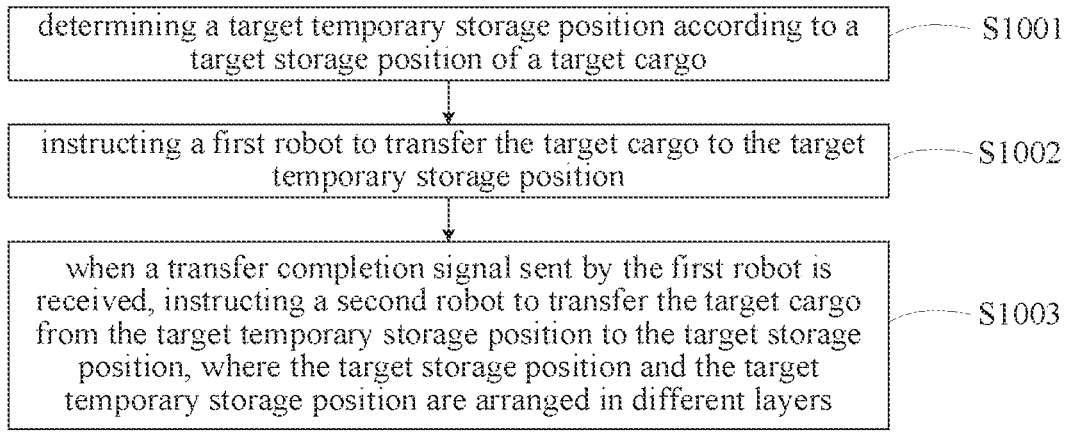
FIG. 14 shows a schematic flowchart of an in-warehouse control method according to Embodiment 3 of the present disclosure.

FIG. 14 shows a schematic flowchart of an in-warehouse control method according to Embodiment 3 of the present disclosure. As shown in FIG. 14, the in-warehouse control method may include S1001-S1003.

At S1001, determining a target temporary storage position according to a target storage position of a target cargo.

At S1002, instructing a first robot to transfer the target cargo to the target temporary storage position.

At S1003, when a transfer completion signal sent by the first robot is received, instructing a second robot to transfer the target cargo from the target temporary storage position to the target storage position, where the target storage position and the target temporary storage position are arranged in different layers.

Herein, referring to FIG. 1 of Embodiment 1, as shown in FIG. 1, the temporary storage position may be arranged on the temporary storage layer board 120 of the shelf 100. The storage position may be arranged on the storage layer board 130 of the shelf. The temporary storage position and the storage position may be arranged on different layers in the same shelf 100, or may also be arranged on different layers of adjacent shelves. The temporary storage position and the storage position may be adjusted and selected according to actual needs, and the arrangement manner of the temporary storage position and the storage position is not limited in the embodiment of the present disclosure.

The target storage position of the target cargo may be determined according to the type of the target cargo. For example, when the type of the target cargo is the type of the most popular cargos, a storage position with the shortest transfer consuming-time may be allocated for the target cargo from the shelf as the target storage position. For example, when the temporary storage position is arranged on the bottom layer of the shelf, a storage position closest to the docking platform and located at a layer above and adjacent to the layer where the temporary storage position is located is the storage position with the shortest transfer consuming-time. In this way, a corresponding consuming-time storage position may be determined as the target storage position according to a popular degree of the target cargo.

In an example, since the target temporary storage position may temporarily store the target cargo, the second robot may be immediately instructed to transfer the target cargo from the target temporary storage position to the target storage position when the transfer completion signal sent by the first robot is received, or the second robot may be instructed to transfer the target cargo from the target temporary storage position to the target storage position after the second robot has completed other operations. In this way, the first robot and the second robot may use the temporary storage position to independently transfer the target cargo, and the first robot and the second robot can drive high-efficiently without the need to directly cooperate to transfer the target cargo, which improves the in-warehouse efficiency of the cargoes.

In an example, according to the in-warehouse control method, the target temporary storage positions may be determined for the target storage positions of the plurality of target cargoes respectively, and the plurality of first robots are instructed to transfer the plurality of target cargoes to the corresponding target temporary storage positions respectively. When the transfer completion signals sent by the plurality of first robots is received, the second robot is instructed to transfer the plurality of target cargoes from the corresponding target temporary storage positions to the corresponding target storage positions respectively.

According to the in-warehouse control method of the embodiment of the present disclosure, the target temporary storage position is determined based on the target storage position of the target cargo, and the first robot is instructed to transfer the target cargo to the target temporary storage position for temporary storage and the second robot is instructed to transfer the target cargo from the target temporary storage position to the target storage position respectively, so as to separate the ground transfer of the target cargo from the transfer of the target cargo between the temporary storage position and the storage position, so that the first robot may independently complete the ground transfer of the target cargo, and the second robot may independently complete transfer of the target cargo between the temporary storage position and the storage position. For the target cargo, the first robot does not need to directly connect with the second robot, which avoids a phenomenon that the first robot and the second robot wait for each other, and helps improve the in-warehouse efficiency of the cargoes.

In an implementation, the driving speed of the first robot may be greater than the driving speed of the second robot.

In in-warehouse control, since the first robot usually transfers the target cargoes from the docking platform to the target temporary storage position of the shelf, the second robot usually transfers the target cargo from the target storage position to the target storage position on a side of the shelf, and a distance between the docking platform and the shelf is much greater than the length of the shelf, so by enabling a driving speed of the first robot greater than a driving speed of the second robot, the number of the target cargoes transferred by the first robot to the target temporary storage position can be adapted to the number of target cargoes transferred by the second robot away from the target temporary storage position, so that the transfer efficiency of the first robot is adapted to the transfer efficiency of the second robot, thereby improving the in-warehouse efficiency of the target cargoes.

In an example, for this in-warehouse control method a plurality of first robots may be further provided to cooperate with the second robot, so that the transfer efficiency of the plurality of first robots is matched with the transfer efficiency of the second robot; or, a plurality of first robots are provided to cooperate with a plurality of second robots, so that the transfer efficiency of the plurality of first robots is matched with the transfer efficiency of the plurality of second robots, to improve the in-warehouse efficiency of the target cargoes. The number of the first robot and the number of the second robot may be adjusted and selected according to actual needs, which is not limited in the embodiment of the present disclosure.

Figure 15:
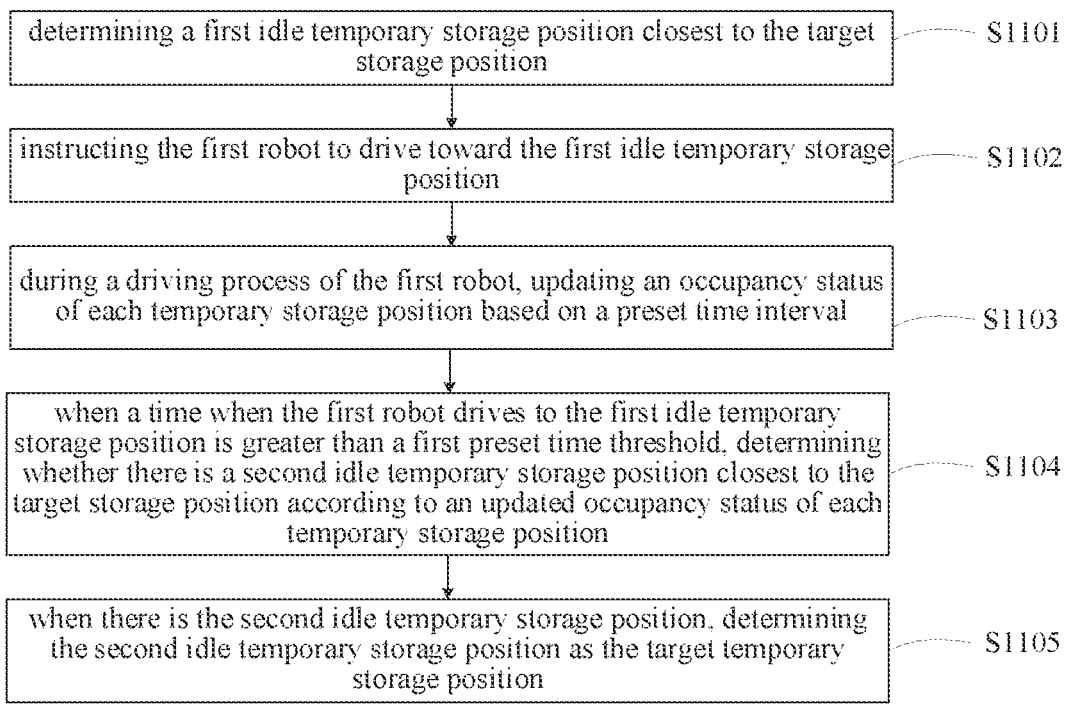
FIG. 15 shows a schematic flowchart of the step S1001 in FIG. 14.

For example, as shown in FIG. 15, the step S1001, the determining the target temporary storage position according to the target storage position of the target cargo, may include SI 101-SI 105.

At S1101, determining a first idle temporary storage position closest to the target storage position.

At S1102, instructing the first robot to drive toward the first idle temporary storage position.

At S1103, during a driving process of the first robot, updating an occupancy status of each temporary storage position based on a preset time interval;

At S1104, when a time when the first robot drives to the first idle temporary storage position is greater than a first preset time threshold, determining whether there is a second idle temporary storage position closest to the target storage position according to an updated occupancy status of each temporary storage position.

At S1105, when there is the second idle temporary storage position, determining the second idle temporary storage position as the target temporary storage position.

Illustratively, as shown in FIG. 1, when the temporary storage position provided by the temporary storage board 122 under the target storage position provided by the target storage board 131 is in an occupied state, the temporary storage position provided by the temporary storage board 123 or the temporary storage position provided by the temporary storage board 124 in a column adjacent to the target storage board 131 may be determined as the first idle temporary storage position, and the first robot is instructed to drive towards the first idle temporary storage position. If the temporary storage position provided by the temporary storage board 122 is updated to an idle state during the driving process of the first robot, and a time for the first robot to drive to the first idle temporary storage position is greater than the first preset time threshold, the temporary storage position provided by the temporary storage board 122 determined as the second idle temporary storage position, and is set to the target temporary storage position. In this way, the target temporary storage position may be dynamically adjusted during the driving process of the first robot, so that the transfer distance between the target temporary storage position and the target storage position is less than the transfer distance between the first idle temporary storage position and the target temporary storage position, which may reduce the transfer distance of the target cargo and improve the in-warehouse efficiency of the cargo.

Figure 16:
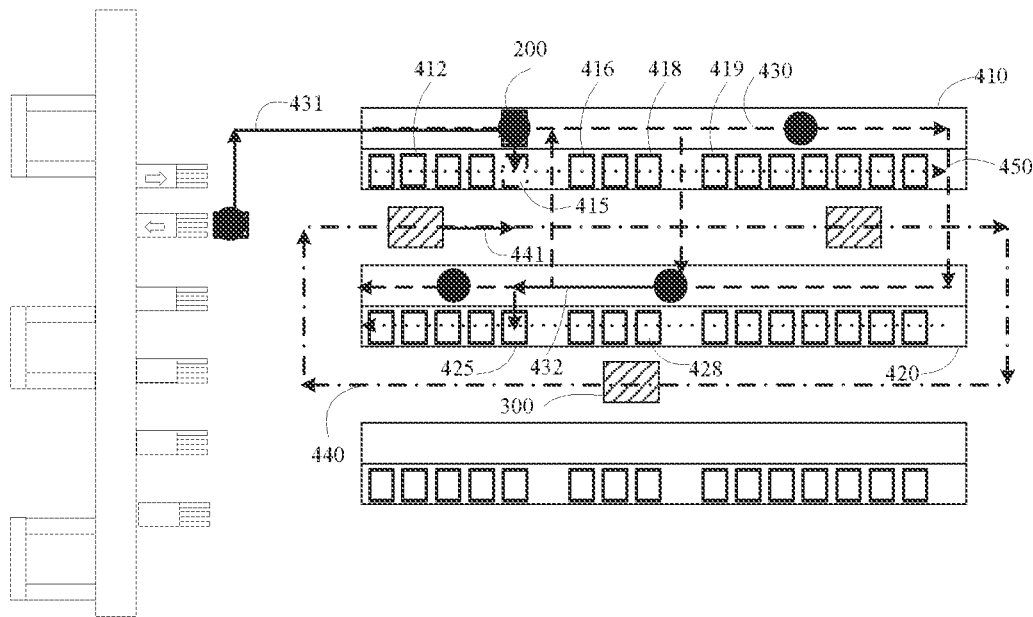
FIG. 16 shows a schematic diagram of an application scenario of the ex-warehouse and in-warehouse control according to Embodiment 3 of the present disclosure.

It should be noted that the storage positions on both sides of the channel between adjacent shelves may share a set of temporary storage positions, that is, the target storage position and the target temporary storage position may be located on two adjacent shelves respectively. For example, as shown in FIG. 16, when the target storage position is located above or below the fifth temporary storage position 415 of the first shelf 410, the first idle temporary storage position may be the fifth temporary storage position 415 of the first shelf 410, and may also be the fifth temporary storage position 425 of the second shelf 420. In this way, the storage positions located on both sides of the second robot driving channel 440 may share the temporary storage position on the first shelf 410.

Herein, the update of the temporary storage position below the target storage position to the idle state may be triggered by the second robot transferring the cargoes temporarily stored in the temporary storage position away.

In an implementation, when there is not the second idle temporary storage position, the first idle temporary storage position is determined as the target temporary storage position. In this way, the target temporary storage position may be directly determined according to the target storage position.

In an implementation, the instructing the first robot to transfer the target cargo to the target temporary storage position, includes:

determining a first transfer route from the preset first robot channel according to position information between the first robot and the target temporary storage position, where the first robot channel includes a first driving channel located on the first outer side of the temporary storage layer board where the target temporary storage position is located, and the first driving channel is located in a vertical projection area of the storage layer board where the target storage position is located; and instructing the first robot to drive to a lower side of the target temporary storage position along the first transfer route.

In an example, as shown in FIG. 16, FIG. 16 shows a schematic diagram of a scenario of an ex-warehouse and in-warehouse control methods according to embodiments of the present disclosure, where the line segment with an arrow indicates the first driving channel 430 located on the first outer side of a temporary storage layer board where the target temporary storage position is located (referring to the first driving channel 141 in FIG. 4). When the target temporary storage position is a fifth temporary storage position 415 in the first shelf 410, the first transfer route 431 is determined from the first driving channel 430, and the first robot 200 is instructed to drive to a lower side of the fifth temporary storage position 415 along the first transfer route 431. In this way, the first robot 200 may drive in the preset first driving channel 430, to prevent the first robot 200 from occupying the driving channel of the second robot 300, improve the driving efficiency between the first robot 200 and the second robot 300, and thereby improve the in-warehouse efficiency.

In an implementation, the instructing the second robot to transfer the target cargo from the target temporary storage position to the target storage position, includes:

determining a second transfer route from a preset second robot channel according to position information between the second robot and the target temporary storage position, where the second robot channel is located outside a vertical projection area; and instructing the second robot to drive to a side of the target temporary storage position along the second transfer route.

In an example, as shown in FIG. 16, the second robot channel 440 (a dotted line with arrows) may be located outside the vertical projection area of the shelf. When the second robot 300 is located at a side of the second temporary storage position 412 of the first shelf 410, the second transfer route 441 between the side of the second temporary storage position 412 and the side of the fifth temporary storage position 415 is determined according to the position information between the second robot 300 and the target temporary storage position (namely, the fifth temporary storage position 415), and the second robot 300 is instructed to drive along the second transfer route 441 to the side of the fifth temporary storage position 415 to take out the target cargo from the fifth temporary storage position 415.

In an implementation, the second driving channel is formed at the third outer side or the fourth outer side of the temporary storage layer board. The temporary storage layer board includes a plurality of temporary storage boards for providing temporary storage positions, a third driving channel is formed between at least two of the temporary storage boards, and the first robot channel includes a second driving channel and a third driving channel.

Illustratively, as shown in FIG. 16, there is a third driving channel (not marked in the figure) between the fifth temporary storage position 415 and the sixth temporary storage position 416 of the first shelf 410, and between the eighth temporary storage position 418 and the ninth temporary storage position 419 of the first shelf 410, and then the first robot 200 may determine a driving route from the third driving channel, and plan a shorter driving route for the first robot 200, improving the driving efficiency of the first robot 200.

In an implementation, the first robot channel includes a cargo access channel located below the temporary storage layer board, and the method further includes: when the first robot is unloaded, determining an unloaded driving route from the first robot channel; and instructing the first robot to drive along the unloaded driving route.

In an example, as shown in FIG. 16, the first robot channel includes a cargo access channel 450 located below the temporary storage layer board (may refer to the cargo access channel 140 of the shelf 100 in FIG. 1), namely, the dashed line with the arrow in FIG. 1. When the first robot is unloaded (namely, the first robot does not carry cargoes), the first robot may drive in the first driving channel 430, the second driving channel, and the cargo access channel 450.

The embodiment of the present disclosure further provides an ex-warehouse control method, which may be applied to the warehousing apparatus 1000 of any implementation in the foregoing Embodiment 1 or the warehousing apparatus 800 of any implementation in the foregoing Embodiment 2. In Embodiment 3, the warehousing apparatus 1000 is used as an example for description.

Figure 17:
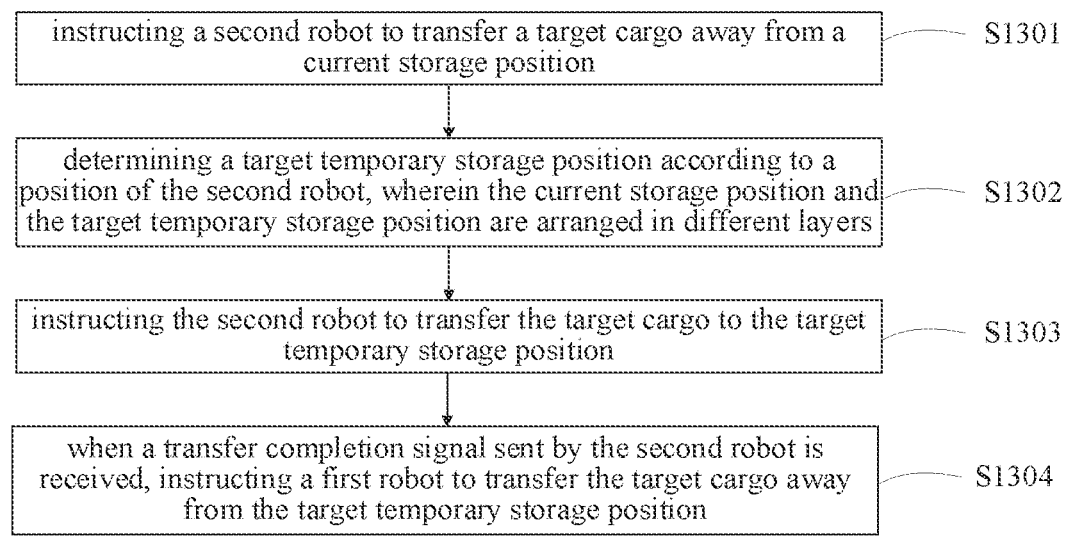
FIG. 17 shows a schematic flowchart of an ex-warehouse control method according to Embodiment 3 of the present disclosure.

FIG. 17 shows a schematic flowchart of an ex-warehouse control method according to Embodiment 3 of the present disclosure. As shown in FIG. 17, the ex-warehouse control method may include S1301-S1304:

At S1301, instructing a second robot to transfer a target cargo away from a current storage position.

At S1302, determining a target temporary storage position according to a position of the second robot, wherein the current storage position and the target temporary storage position are arranged in different layers.

At S1303, instructing the second robot to transfer the target cargo to the target temporary storage position.

At S1304, when a transfer completion signal sent by the second robot is received, instructing a first robot to transfer the target cargo away from the target temporary storage position.

Herein, a setting manner of the temporary storage position and the storage position in the ex-warehouse control method may be the same as the setting manner of the temporary storage position and the storage position in the in-warehouse control method, and the setting manner of the temporary storage position and the storage position is not repeated herein again.

The current storage position of the target cargo may be determined according to identification information of the target cargo in an ex-warehouse list. For example, a relationship mapping table between the current storage position of the target cargo and the identification information of the target cargo may be stored in advance. When the identification information of the target cargo is obtained from the ex-warehouse list, the current storage position of the target cargo may be queried from the relationship mapping table. The current storage position of the target cargo may also be determined in other ways, and the determining manner of the current storage position of the target cargo is not limited in the embodiments of the present disclosure.

In an example, since the target temporary storage position may temporarily store the target cargo, when the transfer completion signal sent by the second robot is received, the first robot may be immediately instructed to transfer the target cargo away from the target temporary storage position, or the first robot may be also instructed to transfer the target cargo away from the target temporary storage position after the first robot has completed other operations. In this way, the first robot and the second robot may use the temporary storage position to independently transfer the target cargo, and the first robot and the second robot can drive high-efficiently without the need to directly cooperate to transfer the target cargo, which improves the ex-warehouse efficiency of the cargoes.

In an example, according to the ex-warehouse control method, the second robot may be instructed to transfer the plurality of target cargoes away from the current storage positions of the plurality of target cargoes respectively, and corresponding target temporary storage positions are respectively determined according to the position of the second robot, and the second robot is instructed to transfer the target cargo to a corresponding target temporary storage position. In this way, the plurality of target cargoes may be transferred to the corresponding target temporary storage positions.

According to the ex-warehouse control method of the embodiment of the present disclosure, the target temporary storage position is determined based on the position of the second robot, and the second robot is instructed to transfer the target cargo to the target temporary storage position and the first robot is instructed to transfer the target cargo away from the target temporary storage position respectively, so as to separate the transfer of the target cargo between the temporary storage position and the storage position from the ground transfer of the target cargo, so that the second robot may independently complete the transfer of the target cargo between the storage position and the temporary storage position, and the first robot may independently complete transfer of the target cargo away from the target temporary storage position. For the target cargo, the first robot does not need to directly connect with the second robot, which avoids a phenomenon that the first robot and the second robot wait for each other, and helps improve the ex-warehouse efficiency of the cargoes.

It should be noted that a robot integrated with a lifting mechanism and an access mechanism is usually used in the ex-warehouse and in-warehouse control methods to transfer and access cargoes; however, due to the high cost of such the robot, and there are relatively long distances between a docking platform for the cargoes and each temporary storage position and each storage position in the shelf, the ex-warehouse and in-warehouse costs of the cargoes per unit time are relatively high, and the efficiency is relatively low.

According to the ex-warehouse and in-warehouse control methods of the embodiments of the present disclosure, the ground transfer of the target cargoes is separated from the transfer of the target cargoes between the temporary storage position and the storage position, so that the first robot may concentrate on completing the ground transfer of the target cargoes, and the second robot may concentrate on completing the transfer of the target cargoes between the temporary storage position and the storage position, where the first robot may not have a lifting mechanism, and the cost of the first robot is much lower than that of the second robot. In this way, one second robot may be used to indirectly cooperate with a plurality of first robots to perform ex-warehouse and in-warehouse control of the target cargoes, which may reduce the ex-warehouse and in-warehouse costs of the target cargoes per unit time and may improve the ex-warehouse and in-warehouse efficiency and the ex-warehouse and in-warehouse capacity of the cargoes.

In an implementation, a driving speed of the first robot is greater than a driving speed of the second robot.

Because in the ex-warehouse control, the first robot usually transfers the target cargo from the target temporary storage position of the shelf to the docking platform, and the second robot usually transfers the target cargo from the current storage position to the target temporary storage position on a side of the shelf, and a distance between the docking platform and the shelf is much greater than the length of the shelf, so by enabling a driving speed of the first robot greater than a driving speed of the second robot, the number of the target cargoes transferred by the second robot to the target temporary storage position may be adapted to the number of target cargoes transferred by the first robot away from the target temporary storage position, so that the transfer efficiency of the second robot is adapted to the transfer efficiency of the first robot, thereby improving the ex-warehouse efficiency of the target cargoes.

In an example, according to the in-warehouse control method, a plurality of first robots may also be arranged to cooperate with the second robot, so as to match an ex-warehouse temporary storage flow of the target cargoes with an ex-warehouse storage flow.

Figure 18:
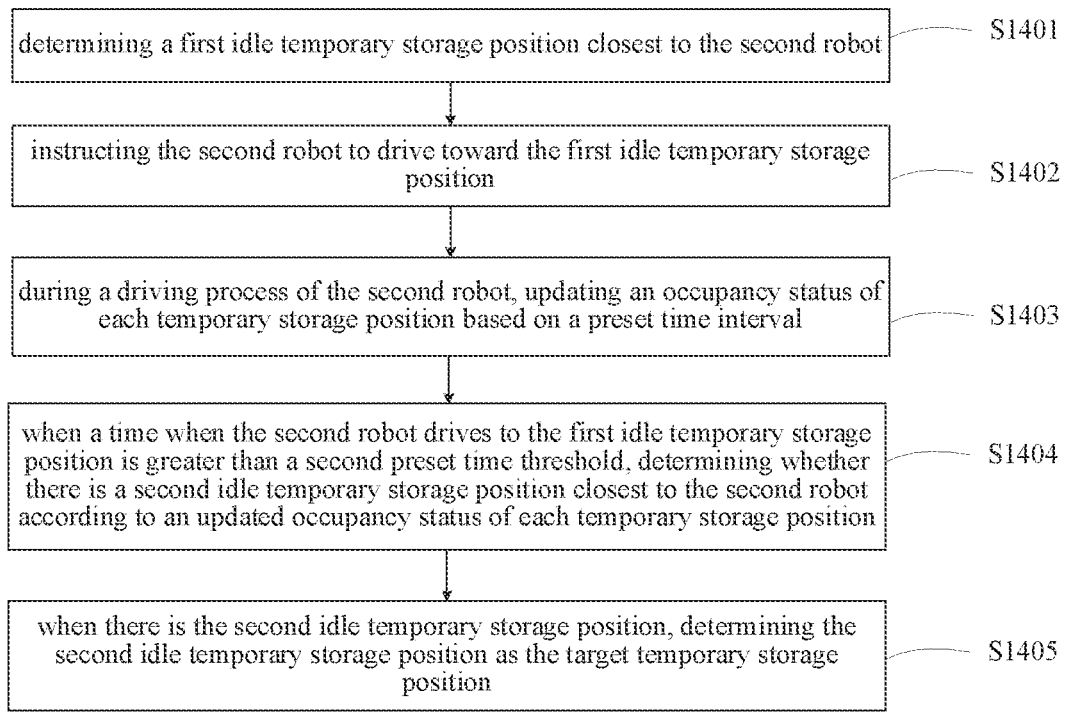
FIG. 18 shows a schematic flowchart of the step S1302 in FIG. 17.

In an implementation, as shown in FIG. 18, the step S1302, determining the target temporary storage position according to the position of the second robot, may include S1401-S1405.

At S1401, determining a first idle temporary storage position closest to the second robot.

At S1402, instructing the second robot to drive toward the first idle temporary storage position.

At S1403, during a driving process of the second robot, updating an occupancy status of each temporary storage position based on a preset time interval.

At S1404, when a time when the second robot drives to the first idle temporary storage position is greater than a second preset time threshold, determining whether there is a second idle temporary storage position closest to the second robot according to an updated occupancy status of each temporary storage position.

At S1405, when there is the second idle temporary storage position, determining the second idle temporary storage position as the target temporary storage position.

In an example, as shown in FIG. 16, when the second robot 300 is located on one side of the second temporary storage position 412 of the first shelf 410, the fifth temporary storage position 415 of the first shelf 410 may be determined as the first idle temporary storage position of the second robot 300; if the occupancy status of the fourth temporary storage position 414 of the first shelf 410 is updated to idle during the process of the second robot 300 driving towards the first idle temporary storage position, when a time when the second robot 300 drives to the fifth temporary storage position 415 is greater than the second preset time threshold, the fourth temporary storage position 414 is determined to be the second idle temporary storage position closest to the second robot 300, and is determined as the target temporary storage position. In this way, during the process of the second robot 300 transferring the target cargoes, the target temporary storage position may be dynamically adjusted, so as to reduce the transfer distance of the second robot 300 and improve the ex-warehouse efficiency of the cargoes.

Herein, the update of the temporary storage position below the target storage position to the idle state may be triggered by the first robot transferring the cargoes temporarily stored in the temporary storage position away.

In an implementation, when there is not the second idle temporary storage position, the first idle temporary storage position is determined as the target temporary storage position, to directly determine the target temporary storage position.

In an implementation, the instructing the first robot to transfer the target cargo away from the target temporary storage position, includes:

determining a transfer-away route from the preset first robot channel according to position information between the first robot and the target temporary storage position, where the first robot channel includes a first driving channel located on one side of the temporary storage layer board where the target temporary storage position is located, and the first driving channel is located in a vertical projection area of the storage layer board where the target storage position is located; and instructing the first robot to drive to a lower side of the target temporary storage position along the transfer-away route.

In an example, as shown in FIG. 16, when the first robot 200 is located in a position, near the eighth temporary storage position 428, in the first driving channel of the second shelf 420, and the target temporary storage position is the fifth temporary storage position 425 of the second shelf 420, a transfer-away route 432 between the first robot 200 and the fifth temporary storage position 425 of the second shelf 420 is determined according to the position information between the first robot 200 and the target temporary storage position (namely, the fifth temporary storage position 425 of the second shelf), and the first robot 200 is instructed to drive along the transfer-away route 432 to a lower side of the target temporary storage position (namely, the fifth temporary storage position 425 of the second shelf) to transfer the target cargo away from the target temporary storage position.

Figure 19:
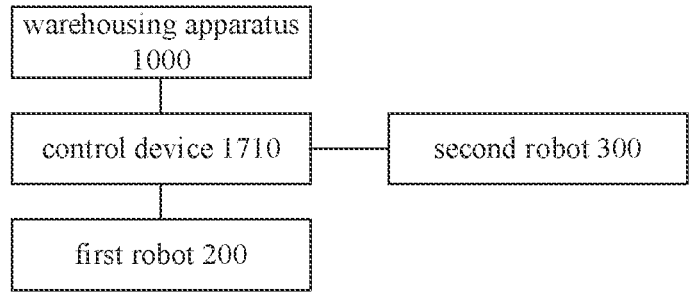
FIG. 19 shows a schematic structural diagram of a warehousing system according to Embodiment 3 of the present disclosure.
Figure 20:
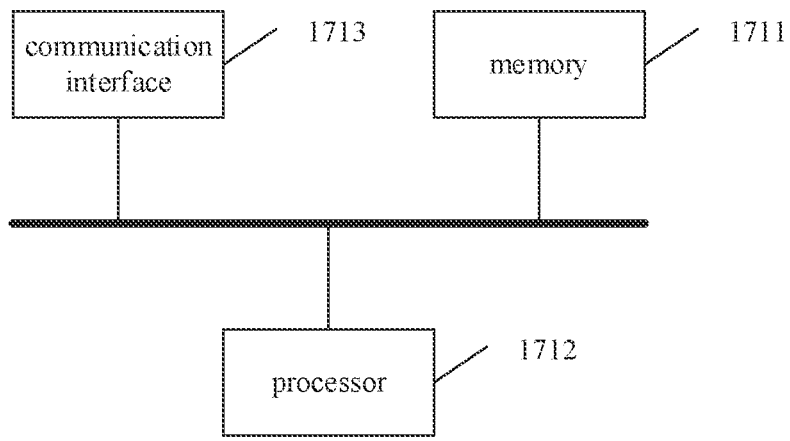
FIG. 20 shows a schematic structural diagram of a control device according to Embodiment 3 of the present disclosure.

FIG. 19 shows a structural block diagram of a warehousing system according to Embodiment 3 of the present disclosure. As shown in FIG. 19 and FIG. 20, the warehousing system includes: a warehousing apparatus 1000; a control device 1710, including a processor 1712 and a memory 1711, wherein the memory 1711 stores instructions, and the instructions, when being loaded and executed by the processor 1712, implement the method of any one of the foregoing implementations; a first robot 200, driving in the first robot channel and having a furcal arm cooperating with a furcal groove; and a second robot 300, driving in the second robot channel.

In an implementation, a driving speed of the first robot 200 is greater than a driving speed of the second robot 300.

FIG. 20 shows a structural block diagram of a control device according to Embodiment 3 of the present disclosure. As shown in FIG. 20, the control device 1710 includes: a memory 1711 and a processor 1712, where a computer program executable on the processor 1712 is stored in the memory 1711. The processor 1712, when executing the computer program, implements the in-warehouse control method and the ex-warehouse control method in the foregoing embodiments. There may be one or more memories 1711 and processors 1712.

The control device further includes: a communication interface 1713, which is used to communicate with an external device and perform data interactive transmission.

If the memory 1711, the processor 1712, and the communication interface 1713 are independently implemented, the memory 1711, the processor 1712, and the communication interface 1713 may be connected to each other through a bus and communicate with each other. The bus may be an Industry Standard Architecture (ISA) bus, a Peripheral Component Interconnect (PCI) bus, an Extended Industry Standard Architecture (EISA) bus, or the like. The bus may include an address bus, a data bus, a control bus, and the like. For ease of representation, only one thick line is used to represent the bus in FIG. 20, but it does not mean that there is only one bus or one type of bus.

Optionally, in a specific implementation, if the memory 1711, the processor 1712, and the communication interface 1713 are integrated on one chip, the memory 1711, the processor 1712, and the communication interface 1713 may communicate with each other through an internal interface.

The foregoing processor may be a central processing unit (CPU), and may also be other general-purpose processors, a digital signal processing (DSP), an application specific integrated circuit (ASIC), a field programmable gate array FPGA), or other programmable logic devices, a discrete gate or transistor logic device, a discrete hardware component, or the like. The general-purpose processor may be a microprocessor or any conventional processor. It should be noted that the processor may be a processor supporting the advanced reduced instruction-set computer machine (advanced RISC machines, ARM) architecture.

Optionally, the above memory may include a program storage area and a data storage area, where the program storage area may store an operating system, and an application program required for at least one function; and the data storage area may store data created according to the use of the control device and the like. In addition, the memory may include a high speed random access memory, and may also include a non-transitory memory, such as at least one disk storage device, a flash memory device, or other non-transitory solid state storage devices. In some embodiments, the memory optionally includes a memory remotely located with respect to the processor, and these remote memories may be connected, via a network, to the control device. Examples of the above networks includes, but are not limited to, the Internet, an intranet, a local area network, a mobile communication network, and combinations thereof.

Embodiment 4

Accordingly, the embodiment of the present disclosure further provides an in-warehouse control apparatus, which may be applied to the temporary storage layer board 120, the shelf 100, and the warehousing apparatus 1000 of any implementation in the foregoing Embodiment 1 or the warehousing apparatus 800 of any implementation in Embodiment 2.

Figure 21:
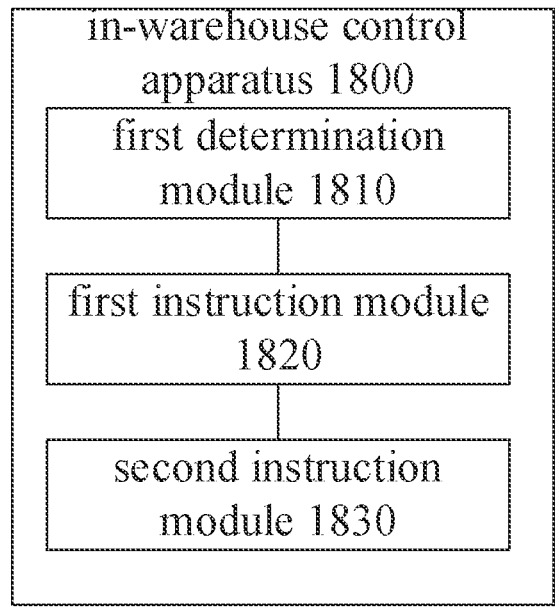
FIG. 21 shows a schematic structural diagram of an in-warehouse control apparatus according to Embodiment 4 of the present disclosure.

FIG. 21 shows a structure block diagram of an in-warehouse control apparatus according to Embodiment 4 of the present disclosure. As shown in FIG. 21, the in-warehouse control apparatus 1800 may include: a first determination module 1810, which may be configured for determining a target temporary storage position according to a target storage position of a target cargo; a first instruction module 1820, which may be configured for instructing a first robot to transfer the target cargo to the target temporary storage position; and a second instruction module 1830, which may be configured for when a transfer completion signal sent by the first robot is received, instructing a second robot to transfer the target cargo from the target temporary storage position to the target storage position, where the target storage position and the target temporary storage position are arranged in different layers.

In an implementation, the driving speed of the first robot is greater than the driving speed of the second robot.

In an implementation, the first determination module 1810 may include: a first determination unit, which may configured for determining a first idle temporary storage position closest to the target storage position; a first instruction unit, which may be configured for instructing the first robot to drive toward the first idle temporary storage position; a first updating unit, which may be configured for during a driving process of the first robot, updating an occupancy status of each temporary storage position based on a preset time interval; a second determination unit, which may configured for when a time when the first robot drives to the first idle temporary storage position is greater than a first preset time threshold, determining whether there is a second idle temporary storage position closest to the target storage position according to an updated occupancy status of each temporary storage position; and a third determination unit, which may configured for when there is the second idle temporary storage position, determining the second idle temporary storage position as the target temporary storage position; and when there is no second idle temporary storage position, determining the first idle temporary storage position as the target temporary storage position.

In an implementation, the first instruction module 1820 may include: a fourth determination unit, which may configured for determining a first transfer route from the preset first robot channel according to position information between the first robot and the target temporary storage position, where the first robot channel includes a first driving channel located on one side of the temporary storage layer board where the target temporary storage position is located, and the first driving channel is located in a vertical projection area of the storage layer board where the target storage position is located; and a second instruction unit, which may configured for instructing the first robot to drive to a lower side of the target temporary storage position along the first transfer route.

In an implementation, the first robot channel includes a cargo access channel located below the temporary storage floor board; and the apparatus further includes: a second determination module, configured for when the first robot is unloaded, determining an unloaded driving route from the first robot channel; and a third instruction module, configured for instructing the first robot to drive along the unloaded driving route.

In an implementation, the second instruction module 1830 may include: a fifth determination unit, which may configured for determining a second transfer route from a preset second robot channel according to position information between the second robot and the target temporary storage position, wherein the second robot channel is located outside a vertical projection area; and a third instruction unit, which may configured for instructing the second robot to drive to a side of the target temporary storage position along the second transfer route.

In an implementation, the second driving channel is formed at the third outer side or the fourth outer side of the temporary storage layer board. The temporary storage layer board is formed with a plurality of temporary storage boards used to provide temporary storage positions, a third driving channel is formed between at least two of the temporary storage boards, and the first robot channel includes a second driving channel and a third driving channel.

Accordingly, the embodiment of the present disclosure further provides an ex-warehouse control apparatus, which may be applied to the warehousing apparatus 1000 of any implementation in the foregoing Embodiment 1 or the warehousing apparatus 800 of any implementation in Embodiment 2.

Figure 22:
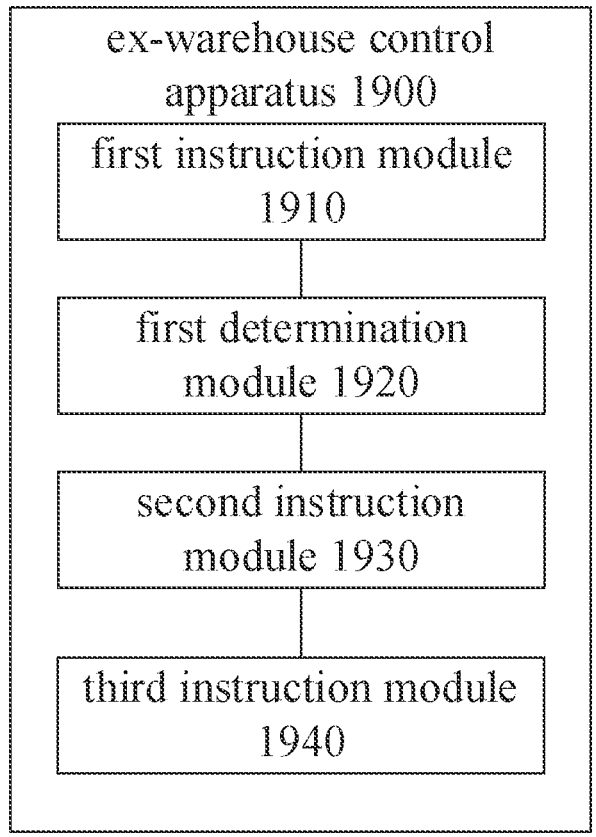
FIG. 22 shows a schematic structural diagram of an ex-warehouse control apparatus according to Embodiment 4 of the present disclosure.

FIG. 22 shows a structure block diagram of an ex-warehouse control apparatus according to Embodiment 4 of the present disclosure. The ex-warehouse control apparatus may be applied to the temporary storage layer board 120, the shelf 100, and the warehousing apparatus 1000 of any implementation in the foregoing Embodiment 1 or the warehousing apparatus 800 of any implementation in Embodiment 2.

As shown in FIG. 22, the ex-warehouse control apparatus 1900 may include: a first instruction module 1910, which may be configured for instructing a second robot to transfer a target cargo away from a current storage position; a first determination module 1920, which may be configured for determining a target temporary storage position according to a position of the second robot, wherein the current storage position and the target temporary storage position are arranged in different layers; a second instruction module 1930, which may be configured for instructing the second robot to transfer the target cargo to the target temporary storage position; and a third instruction module 1940, which may be configured for when a transfer completion signal sent by the second robot is received, instructing a first robot to transfer the target cargo away from the target temporary storage position.

In an implementation, a driving speed of the first robot is greater than a driving speed of the second robot.

In an implementation, the first determination module 1920 may include: a first determination unit, which may be configured for determining a first idle temporary storage position closest to the second robot; a first instruction unit, which may be configured for instructing the second robot to drive toward the first idle temporary storage position; an updating unit, which may be configured for during a driving process of the second robot, updating an occupancy status of each temporary storage position based on a preset time interval; a second determination unit, which may be configured for when a time when the second robot drives to the first idle temporary storage position is greater than a second preset time threshold, determining whether there is a second idle temporary storage position closest to the second robot according to an updated occupancy status of each temporary storage position; and a third determination unit, which may be configured for when there is the second idle temporary storage position, determining the second idle temporary storage position as the target temporary storage position; and when there is no second idle temporary storage position, determining the first idle temporary storage position as the target temporary storage position.

In an implementation, the third instruction module 1940 may include: a fourth determination unit, which may be configured for determining a first transfer route from the preset first robot channel according to position information between the first robot and the target temporary storage position, where the first robot channel includes a first driving channel located on one side of the temporary storage layer board where the target temporary storage position is located, and the first driving channel is located in a vertical projection area of the storage layer board where the target storage position is located; and a second instruction unit, which may be configured for instructing the first robot to drive to a lower side of the target temporary storage position along the first transfer route.

For the functions of each module in each apparatus in the embodiment of the present disclosure, reference may be made to the corresponding description in the foregoing method, which will be not described herein again.

It should be noted that, although the ex-warehouse and in-warehouse control methods and apparatuses are described above with the ex-warehouse and in-warehouse control methods as examples, those skilled in the art can understand that the present disclosure should not be limited to this. In fact, a user may flexibly set the ex-warehouse and in-warehouse control methods and apparatuses according to personal preferences and/or actual application scenarios, as long as the efficiencies of ex-warehouse and in-warehouse can be improved.

An embodiment of the present disclosure provides a computer-readable storage medium, which stores a computer program, and the program, when executed by a processor, implements the method provided in the embodiment of the present disclosure. Other configurations of the foregoing embodiments may be adopted in various technical solutions known to those of ordinary skill in the art now and in the future, and will not be described in detail here.

In the description of this specification, it should be understood that terms "center," "longitudinal," "lateral," "length," "width," "thickness," "up," "down," "front," "rear," "left," "right," "vertical," "horizontal," "top," "bottom," "inner," "outer," "clockwise," "counterclockwise," "axial," "radial," "circumferential," and the like indicate orientations or position relationships based on the orientations or position relationships shown in the drawings, which are only for ease of describing the present disclosure and simplifying the description, rather than indicating or implying that the indicated apparatus or element must have a specific orientation, be configured and operated in a specific orientation, and therefore cannot be understood as a limitation of the present disclosure.

In addition, terms "first" and "second" are used for the purpose of description only, and cannot be understood as indicating or implying relative importance or implicitly indicating the number of technical features indicated. Thus, the features defined by "first" or "second" may explicitly or implicitly include one or more of the features. In the description of the present disclosure, "a plurality of" means two or more, unless specifically defined otherwise.

In the present disclosure, unless specifically defined and limited otherwise, terms "installed," "linked," "connected," "fixed," and the like should be understood in a broad sense, for example, it may be a fixed connection, a detachable connection, or a whole; it may be a mechanical connection, an electrical connection, or a communication; it may be a direct link or an indirect link through an intermediary, and it may be an internal connection between two elements or an interaction relationship between two elements. For a person of ordinary skill in the art, the specific meanings of the foregoing terms in the present disclosure may be understood according to specific circumstances.

In the present disclosure, unless specifically defined and limited otherwise, that the first feature is "above" or "below" the second feature may include the direct contact of the first feature and the second feature, and may also include the contact of the first feature and the second feature through some other features between them, rather than the direct contact between them. Moreover, that the first feature is "above," "over" or "upward" the second feature includes the first feature being directly above and obliquely above the second feature, or it simply means that a horizontal height of the first feature is higher than that of the second feature. That the first feature is "below," "underneath" or "under" the second feature includes the first feature being directly below and obliquely below the second feature, or it simply means that a horizontal height of the first feature is lower than that of the second feature.

The foregoing disclosure provides many different implementations or examples for realizing different structures of the present disclosure. To simplify the content of the present disclosure, components and settings of specific examples are described above. They are certainly only examples, and are not intended to limit the present disclosure. In addition, the present disclosure may repeat reference numerals and/or reference letters in different examples, and this repetition is for the purpose of simplification and clarity, and does not indicate relationships between various implementations and/or settings that are discussed.

What are described above are only specific implementations of the present disclosure, but the protection scope of the present disclosure is not limited to this. Any person skilled in the art may easily think of variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. A temporary storage layer board, applied to a shelf, wherein the temporary storage layer board is used to provide a temporary storage position; the temporary storage layer board is provided with a furcal groove, and the furcal groove is used to cooperate with a furcal arm of a first robot; a cargo access channel for the first robot is formed below the temporary storage layer board, when accessing a cargo, the first robot is in the cargo access channel, and the furcal groove cooperates with the furcal arm on the first robot to access the cargo.

2. The temporary storage layer board of claim 1, comprising a first side and a second side opposite to the first side, wherein a side of the first side, which is away from a center of the temporary storage layer board, is a first outer side; a side of the second side, which is away from the center of the temporary storage layer board, is a second outer side; and a first driving channel for the first robot to drive is formed on: the first outer side of the temporary storage layer board, the second outer side of the temporary storage layer board, or the first outer side and the second outer side of the temporary storage layer board.

3. The temporary storage layer board of claim 2, further comprising a third side and a fourth side opposite to the third side, wherein a side of the third side, which is away from the center of the temporary storage layer board, is a third outer side; a side of the fourth side, which is away from the center of the temporary storage layer board, is a fourth outer side;
 a second driving channel for the first robot to drive is formed on; the third outer side of the temporary storage layer board, the fourth outer side of the temporary storage layer board, or the third outer side and the fourth outer side of the temporary storage layer board; and
 the second driving channel is connected to the first driving channel.

4. The temporary storage layer board of claim 1, wherein the temporary storage layer board comprises a plurality of temporary storage boards, each of the temporary storage boards is provided with the furcal groove, and a third driving channel for the first robot to drive is formed between at least two of the temporary storage boards.

5. The temporary storage layer board of claim 1, wherein the temporary storage layer board comprises a cross beam arranged in a horizontal direction and a plurality of temporary storage members arranged at an interval on an inner side of the cross beam, each of the temporary storage members comprises two support arms, and the furcal groove is formed between the two support arms.

6. The temporary storage layer board of claim 5, wherein the temporary storage position is formed by the temporary storage members or formed by adjacent support arms of adjacent temporary storage members.

7. The temporary storage layer board of claim 5, wherein the inner side of the cross beam is fixedly connected to a first end of each of the support arms; the temporary storage members further comprise a plurality of wing plates, and each of the wing plates is respectively connected between the inner side of the cross beam and an inner side of each of the support arms.

8. The temporary storage layer board of claim 5, further comprising:
 a plurality of fixing plates, wherein the plurality of fixing plates are respectively connected between adjacent temporary storage members, and are connected to the inner side of the cross beam.

9. A shelf, comprising:
 a plurality of columns arranged at an interval in a horizontal direction;
 at least one temporary storage layer board; and
 at least one storage layer board, arranged at an interval with the at least one temporary storage layer board in a vertical direction through the columns, wherein the storage layer board is used to provide a plurality of storage positions;
 wherein the at least one temporary storage layer board is used to provide a temporary storage position: the temporary storage layer board is provided with a furcal groove, and the furcal groove is used to cooperate with a furcal arm of a first robot; a cargo access channel for the first robot is formed below the temporary storage layer board, when accessing a cargo, the first robot is in the cargo access channel, and the furcal groove cooperates with the furcal arm on the first robot to access the cargo.

10. A warehouse control method, comprising:
 determining a target temporary storage position according to a target storage position of a target cargo;
 instructing a first robot to transfer the target cargo to the target temporary storage position; and
 when a transfer completion signal sent by the first robot is received, instructing a second robot to transfer the target cargo from the target temporary storage position to the target storage position;
 wherein the target storage position is provided by a temporary storage layer board: the temporary storage layer board is applied to a shelf: the temporary storage layer board is provided with a furcal groove, and the furcal groove is used to cooperate with a furcal arm of the first robot: a cargo access channel for the first robot is formed below the temporary storage layer board, when accessing the target cargo, the first robot is in the cargo access channel, and the furcal groove cooperates with the furcal arm on the first robot to access the target cargo.

11. The method of claim 10, wherein the instructing the first robot to transfer the target cargo to the target temporary storage position, comprises:
 determining a first transfer route from a first robot channel according to position information between the first robot and the target temporary storage position; and
 instructing the first robot to drive to a lower side of the target temporary storage position along the first transfer route.

12. The method of claim 11, wherein the first robot channel comprises a first driving channel located on a first outer side of the temporary storage layer board where the target temporary storage position is located, and the first driving channel is located in a vertical projection area of a storage layer board where the target storage position is located.

13. The method of claim 12, wherein the first robot channel comprises a cargo access channel located below the temporary storage layer board; and the method further comprises:
 when the first robot is unloaded, determining an unloaded driving route from the first robot channel; and
 instructing the first robot to drive along the unloaded driving route.

14. The method of claim 10, wherein the target storage position and the target temporary storage position are arranged in different layers.

15. The method of claim 11, wherein a second driving channel is formed on: a third outer side of the temporary storage layer board, a fourth outer side of the temporary storage layer board, or the third outer side and the fourth outer side of the temporary storage layer board;
 the temporary storage layer board is formed with a plurality of temporary storage boards used to provide temporary storage positions, a third driving channel is formed between at least two of the temporary storage boards, and the first robot channel comprises the second driving channel and the third driving channel.

16. A warehouse control method, comprising:
 instructing a second robot to transfer a target cargo away from a current storage position;
 determining a target temporary storage position according to a position of the second robot;
 instructing the second robot to transfer the target cargo to the target temporary storage position; and
 when a transfer completion signal sent by the second robot is received, instructing a first robot to transfer the target cargo away from the target temporary storage position;

wherein the target storage position is provided by a temporary storage layer board: the temporary storage layer board is applied to a shelf: the temporary storage layer board is provided with a furcal groove, and the furcal groove is used to cooperate with a furcal arm of the first robot: a cargo access channel for the first robot is formed below the temporary storage layer board, when accessing the target cargo, the first robot is in the cargo access channel, and the furcal groove cooperates with the furcal arm on the first robot to access the target cargo.

17. The method of claim 16, wherein the instructing the first robot to transfer the target cargo away from the target temporary storage position, comprises:
- determining a transfer-away route from a first robot channel according to position information between the first robot and the target temporary storage position; and
- instructing the first robot to drive to a lower side of the target temporary storage position along the transfer-away route.

18. The method of claim 17, wherein the first robot channel comprises a first driving channel located on a first outer side of the temporary storage layer board where the target temporary storage position is located, and the first driving channel is located in a vertical projection area of a storage layer board where a target storage position is located.

19. The temporary storage layer board of claim 2, wherein the first driving channel is located between the first side of the temporary storage layer board and columns of the shelf, along a direction of arrangement of the first side and the second side.

20. The temporary storage layer board of claim 3, wherein the second driving channel is located between the third side of the temporary storage layer board and columns of the shelf, along a direction of arrangement of the third side and the fourth side.

* * * * *